United States Patent [19]
Kessler et al.

[11] Patent Number: 5,721,921
[45] Date of Patent: Feb. 24, 1998

[54] BARRIER AND EUREKA SYNCHRONIZATION ARCHITECTURE FOR MULTIPROCESSORS

[75] Inventors: Richard E. Kessler, Eau Claire; Steven M. Oberlin, Chippewa Falls; Gregory M. Thorson, Altoona, all of Wis.

[73] Assignee: Cray Research, Inc., Eagan, Minn.

[21] Appl. No.: 450,251

[22] Filed: May 25, 1995

[51] Int. Cl.[6] .......................... G06F 13/38; G06F 15/16
[52] U.S. Cl. .............. 395/672; 395/200.15; 364/DIG. 1; 364/DIG. 2; 370/390
[58] Field of Search ..................... 395/200.06, 200.15, 395/550, 650, 293, 800, 200.16, 200.01, 393, 672; 364/DIG. 1, DIG. 2; 340/825.02, 825.8; 370/94.2, 94.3, 390

[56] References Cited

U.S. PATENT DOCUMENTS

| | | | |
|---|---|---|---|
| 4,933,933 | 6/1990 | Dally et al. | 370/60 |
| 5,036,459 | 7/1991 | Den et al. | 364/200 |
| 5,105,424 | 4/1992 | Flaig et al. | 370/941 |
| 5,157,692 | 10/1992 | Horie et al. | 375/38 |
| 5,161,156 | 11/1992 | Baum et al. | 371/7 |
| 5,276,899 | 1/1994 | Neches | 395/200.06 |
| 5,365,228 | 11/1994 | Childs et al. | 340/825.8 |
| 5,434,995 | 7/1995 | Oberlin et al. | 395/550 |

FOREIGN PATENT DOCUMENTS

| | | |
|---|---|---|
| 0353819 | 2/1990 | European Pat. Off. |
| 0475282 | 9/1990 | European Pat. Off. |
| 0473452 | 3/1992 | European Pat. Off. |
| 0570729 | 4/1993 | European Pat. Off. |
| WO 88/04810 | 6/1988 | WIPO |
| WO95/16236 | 6/1995 | WIPO |

OTHER PUBLICATIONS

"Turning Eureka Steps into Calculations in Automatic Program", UK IT, 1990 (IEE Conf. Pub. 316); A Bundy et al.; pp. 221–226.

Hiroaki Ishihata, et al., "Architecture of Highly Parallel AP1000 Computer", Scripta Technica, Inc., Systems and Computers in Japan 24, No. 7, pp. 69–76, (1993).

Matthew T. O'Keefe, et al., "Static Barrier MIMD: Architecture and Performance Analysis", Journal of Parallel and Distributed Computing No. 2, pp. 126–132, (Mar. 25, 1995).

Bradley R. Carlile, "Algorithms and Design: The CRAP APP Shared–Memory System", Comcon Spring '93, pp. 312–320, Feb. 22, 1993, San Francisco, CA.

Rajiv Gupta, et al., "High speed Synchronization of Processors Using Fuzzy Barriers", International Journakl of Parallel Programming 19 (1990) Feb., No. 1, New York, US pp. 53–73.

Min–you Wu, et al., "Do and Forall: Temporal and Spacial Control Structures", Procedings, Third Workshop on Compilers for Parallel Computers, ACPC/TR, Jul. 1992.

Primary Examiner—Daniel H. Pan
Attorney, Agent, or Firm—Schwegman, Lundberg, Woessner & Kluth, P.A.

[57] ABSTRACT

Method and apparatus for facilitating barrier and eureka synchronization in a massively parallel processing system. The present barrier/eureka mechanism provides a partitionable, low-latency, immediately reusable, robust mechanism which can operate on a physical data-communications network and can be used to alert all processor entities (PEs) in a partition when all of the PEs in that partition have reached a designated barrier point in their individual program code, or when any one of the PEs in that partition has reached a designated eureka point in its individual program code, or when either the barrier or eureka requirements have been satisfied, which ever comes first. Multiple overlapping barrier/eureka synchronization partitions are available simultaneously through the use of a plurality of parallel barrier/eureka synchronization domains. The present barrier/eureka mechanism may be implemented on either a dedicated barrier network, or superimposed as a virtual barrier/eureka network operating on a physical data-communications network which is also used for data interchange, operating system functions, and other purposes.

20 Claims, 25 Drawing Sheets

| CURRENT FANIN STATE | SEND | OPERATION RECEIVED | | |
|---|---|---|---|---|
| | | FL_E | FL_B | FL_EB |
| FL_S_IDLE | N/A | GOTO FL_S_EUREKA | UPDATE BM/CS;<br>IF (BAR COMPLETE)<br>　　GOTO FL_S_BARRIER<br>ELSE<br>　　GOTO FL_S_IDLE | UPDATE BM/CS;<br>IF (BAR COMPLETE)<br>　　GOTO FL_S_EUR_BAR<br>ELSE<br>　　GOTO FL_S_EUREKA |
| FL_S_EUREKA | GOTO FL_S_IDLE (FL_E, FO_E) | GOTO FL_S_EUREKA | UPDATE BM/CS;<br>IF (BAR COMPLETE)<br>　　GOTO FL_S_EUR_BAR<br>ELSE<br>　　GOTO FL_S_EUREKA | UPDATE BM/CS;<br>IF (BAR COMPLETE)<br>　　GOTO FL_S_EUR_BAR<br>ELSE<br>　　GOTO FL_S_EUREKA |
| FL_S_BARRIER | GOTO FL_S_IDLE (FL_B, FO_B) | UNDEFINED | UNDEFINED | UNDEFINED |
| FL_S_EUR_BAR | GOTO FL_S_IDLE FL_EB, FO_B)* | UNDEFINED | UNDEFINED | UNDEFINED |

\* IGNORE PRIOR EUREKA IN THIS CASE

FIG. 14

| CURRENT FANOUT STATE | OPERATION RECEIVED | | | | |
|---|---|---|---|---|---|
| | SEND | FO_E | FO_B | FO_BE |
| FO_S_IDLE | N/A | GOTO FO_S_EUREKA | GOTO FO_S_BARRIER | GOTO FO_S_BARRIER_EUREKA |
| FO_S_EUREKA | GOTO FO_S_IDLE (FO_E) | GOTO FO_S_EUREKA | GOTO FO_S_BARRIER* | GOTO FO_S_BARRIER_EUREKA* |
| FO_S_BARRIER | GOTO FO_S_IDLE (FO_B) | GOTO FO_S_BARRIER_EUREKA | UNDEFINED | UNDEFINED |
| FO_S_BARRIER_EUREKA | GOTO FI_S_IDLE (FO_BE) | GOTO FO_S_BARRIER_EUREKA | UNDEFINED | UNDEFINED |

\* IGNORE PRIOR EUREKA IN THIS CASE

FIG. 15

| VALUE | NAME | DESCRIPTION |
| --- | --- | --- |
| 000 | S_IDLE | IDLE |
| 001 | S_IDLE_I | AN INTERRUPT WILL OCCUR WHEN A EUREKA EVENT COMES |
| 010 | S_EUR | A EUREKA EVENT CAME |
| 011 | S_EUR_I | A EUREKA CAME, INTERRUPT SIGNALLED |
| 100 | S_ARM | BARRIER IS ARMED |
| 101 | S_ARM_I | BARRIER IS ARMED, AN INTERRUPT WILL OCCUR ON COMPLETION |
| 110 | S_BAR | BARRIER JUST COMPLETED |
| 111 | S_BAR_I | BARRIER JUST COMPLETED, INTERRUPT SIGNALLED |

FIG. 18

| VALUE | NAME | DESCRIPTION |
|---|---|---|
| 000 | OP_CLEAR | CLEAR |
| 001 | | RESERVED |
| 010 | OP_EUR | SEND EUREKA |
| 011 | OP_INT | PLEASE INTERRUPT WHEN A EUREKA EVENT OCCURS |
| 100 | OP_BAR | ARM BARRIER |
| 101 | OP_BAR_I | ARM BARRIER, PLEASE INTERRUPT ON COMPLETION |
| 110 | OP_EUR_B | SEND EUREKA, ARM BARRIER |
| 111 | OP_RESET | RESET (SYSTEM PRIVILEGED) |

| STATES STORED IN C-CHIP | OPERATIONS FROM PE ||||||| OP. FROM FANOUT TREE ||
| --- | --- | --- | --- | --- | --- | --- | --- | --- | --- |
| | OP_CLEAR | OP_INT | OP_EUR | OP_BAR | OP_BAR_I | OP_EUR_B | OP_RESET | EUREKA EVENT | BARRIER COMPLETION |
| S_IDLE | NOP | GOTO S_IDLE_I | SEND EUREKA, GOTO S_EUR | ARM BARRIER, GOTO S_ARM | ARM BARRIER, GOTO S_ARM_I | SEND EUREKA, ARM BARRIER, GOTO S_ARM | GOTO S_IDLE | GOTO S_EUR | NOP |
| S_IDLE_I | GOTO S_IDLE | NOP | INTERRUPT, SEND EUREKA, GOTO S_EUR_I | ARM BARRIER, GOTO S_ARM | ARM BARRIER, GOTO S_ARM_I | INTERRUPT, SEND EUREKA, ARM BARRIER, GOTO S_ARM | GOTO S_IDLE | INTERRUPT, GOTO S_EUR_I | NOP |
| S_EUR | NOP | INTERRUPT, GOTO S_EUR_I | NOP | ARM BARRIER, GOTO S_ARM | ARM BARRIER, GOTO S_ARM_I | ARM BARRIER, GOTO S_ARM | GOTO S_IDLE | NOP | NOP |
| S_EUR_I | GOTO S_EUR | NOP | NOP | ARM BARRIER, GOTO S_ARM | ARM BARRIER, GOTO S_ARM_I | ARM BARRIER, GOTO S_ARM | GOTO S_IDLE | NOP | NOP |

FIG. 20A

| | | | | | | | | | |
|---|---|---|---|---|---|---|---|---|---|
| S_ARM | NOP | NOP | NOP | NOP | NOP | NOP | GOTO S_IDLE | NOP | GOTO S_BAR |
| S_ARM_I | GOTO S_ARM | GOTO | NOP | NOP | NOP | NOP | GOTO S_IDLE | NOP | INTERRUPT, GOTO S_BAR_I |
| S_BAR | GOTO S_IDLE | GOTO S_IDLE_I | SEND EUREKA, GOTO S_EUR | ARM BARRIER, GOTO S_ARM | ARM BARRIER, GOTO S_ARM_I | SEND EUREKA, ARM BARRIER, GOTO S_ARM | GOTO S_IDLE | GOTO S_EUR | NOP |
| S_BAR_I | GOTO S_IDLE | GOTO S_IDLE_I | SEND EUREKA, GOTO S_EUR | ARM BARRIER, GOTO S_ARM | ARM BARRIER, GOTO S_ARM_I | SEND EUREKA, ARM BARRIER, GOTO S_ARM | GOTO S_IDLE | GOTO S_EUR | NOP |

FIG. 20B

| 39 | 38 | 37 | 36 | 35 | 34 | 33 | 32 | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 09 | 08 | 07 | 06 | 05 | 04 | 03 | 02 | 01 | 00 |
|---|---|---|---|---|---|---|---|---|---|---|---|---|---|---|---|---|---|---|---|---|---|---|---|---|---|---|---|---|---|---|---|---|---|---|---|---|---|---|---|
| 1 | Q | Q | Q | Q | Q | Q | Q | Z | Z | P | C | C | C | C | 1 | Z | Z | Z | Z | Z | Z | Z | Z | Z | Z | Z | Z | Z | Z | Z | Z | Z | Z | Z | Z | Z | Z | 0 | 0 |

| NODE (Z,Y,X) | PARENT FIELD | CHILD MASK |
|---|---|---|
| 0,0,0 | 3 | 0000001 |
| 0,0,1 | 3 | 0000001 |
| 0,0,2 | 3 | 0000001 |
| 0,1,0 | 3 | 0000001 |
| 0,1,1 | 3 | 0000001 |
| 0,1,2 | 3 | 0000001 |
| 0,2,0 | 3 | 0000001 |
| 0,2,1 | 3 | 0000001 |
| 0,2,2 | 3 | 0000001 |

| NODE (Z,Y,X) | PARENT FIELD | CHILD MASK |
|---|---|---|
| 1,0,0 | 2 | 1100001 |
| 1,0,1 | 2 | 1100001 |
| 1,0,2 | 2 | 1100001 |
| 1,1,0 | 1 | 1111001 |
| 1,1,1 | 0 | 1111111 |
| 1,1,2 | −1 | 1111001 |
| 1,2,0 | −2 | 1100001 |
| 1,2,1 | −2 | 1100001 |
| 1,2,2 | −2 | 1100001 |

| NODE (Z,Y,X) | PARENT FIELD | CHILD MASK |
|---|---|---|
| 2,0,0 | −3 | 0100000 |
| 2,0,1 | −3 | 0100000 |
| | | |
| 2,1,0 | −3 | 0100000 |
| 2,1,1 | −3 | 0100000 |
| | | |
| 2,2,0 | −3 | 0100000 |
| 2,2,1 | −3 | 0100000 |
| | | |

| NODE (Z,Y,X) | PARENT FIELD | CHILD MASK |
|---|---|---|
| 3,0,0 | −3 | 0000001 |
| 3,0,1 | −3 | 0000001 |
| 3,0,2 | −3 | 0000001 |
| 3,1,0 | −3 | 0000001 |
| 3,1,1 | −3 | 0000001 |
| 3,1,2 | −3 | 0000001 |
| 3,2,0 | −3 | 0000001 |
| 3,2,1 | −3 | 0000001 |
| 3,2,2 | −3 | 0000001 |

FIG. 23

| PARENT NODE | ENCODING |
|---|---|
| −Z | −3 |
| −Y | −2 |
| −X | −1 |
| NONE (I.E., THIS IS THE ROOT NODE) | 0 |
| +X | +1 |
| +Y | +2 |
| +Z | +3 |

FIG. 24

BARRIER AND EUREKA SYNCHRONIZATION ARCHITECTURE FOR MULTIPROCESSORS

FIELD OF THE INVENTION

The present invention relates to methods and apparatus for multiprocessor systems and more specifically to synchronization of processes running on multiprocessor systems.

BACKGROUND OF THE INVENTION

Massively parallel processing (MPP) systems are computing systems comprised of hundreds or thousands of processing elements (PEs). While the power of a multiple-instruction multiple-data (MIMD) MPP computer system lies in its ability to execute independent threads of code simultaneously, the inherently asynchronous states of the PEs (with respect to each other) makes it difficult in such a system to enforce a deterministic order of events when necessary. Program sequences involving interaction between multiple PEs such as coordinated communication, sequential access to shared resources, controlled transitions between parallel regions, etc., may require synchronization of the PEs in order to assure proper execution.

Very fast synchronization is required for high-performance highly parallel processing with asynchronous processors (i.e., processors which execute programs independently of each other). This synchronization involves communication among the computational entities which work together on an overall application program. An important synchronization capability in any programming model is the "barrier". Barriers are points placed in the code beyond which no processor participating in a particular computation is to be allowed to proceed until all processors have arrived at their respective barrier points. Since PEs may wait at a barrier until alerted that all PEs have arrived at the barrier, it is very important to minimize the latency of the barrier mechanism. The latency of a barrier mechanism is defined as the period of time between when the last processor arrives at a barrier, and when all processors have been notified that the requirements of the barrier have been satisfied (the term for meeting these requirements is also called "satisfying the barrier"). During this period of time, all PEs may be idle waiting for the barrier to be satisfied. Hence barriers can be used as a serialization point in a parallel code (a point from which all PEs can proceed ahead, having waited for other PEs to be synchronized). Because a barrier defines a serialization point in a program, it is important to keep the barrier latency as low as possible, in order that the work to be done after the barrier can be started as soon as possible.

Another important synchronization capability in any programming model is the "eureka". Eureka are points placed in the code which notify all other processors of a particular group of processors participating in a computation that one processor has reached that eureka point in its computation. Typically, the eureka point is a notification that the processor has reached a solution to the computation (e.g., found the item being searched for by the group). Since processors will typically abandon the work they are doing upon being notified that another PE has arrived at its eureka point, it is also very important to minimize the latency of the eureka mechanism. The latency of a eureka mechanism is defined as the period of time between when the first processor arrives at a eureka, and when all processors have been notified that the eureka has been satisfied. During this period of time, all other PEs may be doing fruitless computation even though the eureka has been satisfied. As soon as the other PEs have been notified that the eureka has been satisfied, they can proceed to the next stage of their computation. Hence eurekas can also be used as a serialization point in a parallel code. Because a eureka defines a serialization point in a program, it is important to keep the eureka latency as low as possible.

Barriers and eurekas can be implemented entirely by software means, but software schemes are typically encumbered by long latencies and/or limited parallelism restricting how many processors can arrive at the barrier simultaneously without artificial serialization (e.g., atomic test-and-set or read-modify-write type operations which impose serialization by software convention or style).

Hardware support for barriers and eurekas, while reducing the latency problems associated with barriers and eurekas implemented by purely software means, can have other shortcomings that limit the utility of the mechanism in a production computing system. (Production computing systems, which support many users and often have less controlled environments than do more theoretical test-bed computing systems, demand that the barrier resource and eureka resource—like all resources—be partitionable among multiple users while maintaining protective boundaries between users.) In addition, the barrier resource and eureka resource must have functions which are rich enough to allow isolation between the operating system and the user executing within the same partition. Provision must also be made for fault tolerance to insure the robust nature of the barrier and eureka mechanism.

Hardware mechanisms may also suffer from an inability to operate synchronously. This inability may require that a PE, upon discovering that a barrier has been satisfied (all PEs have arrived at that barrier point in the program) or that a eureka has been satisfied (one PE has arrived at that eureka point in the program), wait until all PEs have discovered that the barrier or eureka has been reached before it may proceed through the next section of program code. The ability to operate synchronously enables the barrier mechanism and eureka mechanism to be immediately reusable without fear of race conditions (e.g., where, due to timing variances, some PEs cannot determine whether the barrier is being "armed" (initialized), has been armed, or has been satisfied).

Hardware mechanisms may also require that a PE explicitly test a barrier flag or eureka flag to discover when the respective condition has been satisfied. This can prevent a PE from accomplishing other useful work while the barrier remains unsatisfied, or force the programmer to include periodic tests of the barrier and eureka into the program in order to accomplish other useful work while a barrier or eureka is pending. This can limit the usefulness of a eureka mechanism when used as a means of terminating speculative parallel work (e.g., a database search) when the work has been completed (e.g. the searched-for item has been found).

Hardware mechanisms may require that the overall barrier tree be hardwired in a rigid configuration. While subportions of the barrier tree may be used for separate barrier networks, there is often little flexibility to configure various barrier trees.

It is often desirable to allocate some, but not all, of the processors in a parallel processing network to some particular application (software) program, and to use the other remaining processors for some other program. This allocation can change over time. It is thus desirable to have a subset of all processors in a parallel-processing network participating in a barrier and/or eureka synchronization, and to be able to dynamically change the configuration over time.

SUMMARY OF THE INVENTION

The present invention provides a method and apparatus that facilitates highly functional barrier and eureka synchronization in a massively parallel processing system. The present barrier/eureka mechanism provides a partitionable, low-latency, immediately reusable, robust mechanism which can operate on a physical data-communications network and can be used to alert all PEs in a partition when all of the PEs in that partition have reached a designated barrier point in their individual program code, or when any one of the PEs in that partition has reached a designated eureka point in its individual program code, or when either the barrier or eureka requirements have been satisfied, which ever comes first. Multiple overlapping barrier/eureka synchronization partitions are available simultaneously. The present barrier/eureka mechanism may be implemented on either a dedicated barrier network, or superimposed as a virtual barrier/eureka network operating on a data-communications network which is also used for conventional data interchange, operating system functions, and other purposes.

The present invention also teaches a method and apparatus for a node router for use in a multiprocessor computer system. The node router includes a plurality of node interconnection ports operable to connect the node router to a plurality of other node routers, a BES state register, and a BES messaging circuit coupled to the node interconnection ports. The BES messaging circuit selectively sends and receives BES messages between the node router and the other node routers. The BES messages include a barrier-join message, a eureka message, and a barrier-complete message. In one embodiment, counts of outstanding memory operations are maintained at each node, and before a barrier (or eureka) is joined, the hardware checks to make sure there are no outstanding memory operations. The node router also includes a BES-state changer coupled to the BES-state register and to the BES-messaging circuit. The BES-state changer changes the contents of the BES-state register responsive to a BES state stored in the BES-state register and to a BES message received by the BES-messaging circuit.

According to another aspect of the present invention, the node router also includes a barrier/eureka synchronization (BES) child-connection register coupled to the node-interconnection ports, wherein the BES child-connection register specifies which of the other node routers are children of this node router. The node router also includes a BES parent-connection register coupled to the node-interconnection ports, wherein the BES parent-connection register specifies which one of the other node routers is a parent of this node router.

According to another aspect of the present invention, a method is provided to perform the BES function.

BRIEF DESCRIPTION OF THE DRAWINGS

In the following detailed description of the invention, reference is made to the accompanying drawings which form a part hereof, and in which is shown by way of illustration only, specific exemplary embodiments in which the invention may be practiced. It is to be understood that other embodiments may be utilized, and structural changes may be made, without departing from the scope of the present invention.

FIG. 14 is a table of FANIN state transitions.

FIG. 15 is a table of FANOUT state transitions.

FIG. 18 is a table of BES unit states.

FIGS. 20A and 20B, placed next to one another as shown in FIG. 20, form a table of BES-unit state transitions.

FIG. 21 is an exemplary structure of a barrier register address 210.

FIG. 23 is a table showing an example configuration for a BES entity 80 operating on the network portion shown in FIG. 22.

FIG. 24 is a table showing an example encoding for parent node values which are used in one embodiment of PTRCI register 722.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

The barrier/eureka synchronization (BES) architecture of the present invention provides an inexpensive means to support both barrier- and eureka-synchronization operations with any existing (or added) inter-processor data-communication network. The preferred network is asynchronous (i.e., "asynchronous" here means a network which operates to transmit data independently of the processing occurring within the attached PEs), and preferably uses point-to-point communication channels. (Point-to-point communications channels link one point to one other point, as opposed to one-to-many channels such as busses or broadcast systems.) The routing nodes of the normal MPP communication network cooperate, communicating via special messages along the existing (or added) direct connections in order to provide very fast, parallel resolution of the synchronization operations. Since only the already-available inter-processor communication network and routing nodes, rather than an additional network, are preferably used to implement the synchronization primitives (those basic operations used as building blocks for higher-level functions), the system can be implemented at little or no additional cost to the network, while still providing high-flexibility, low-latency synchronization.

Figure 1:
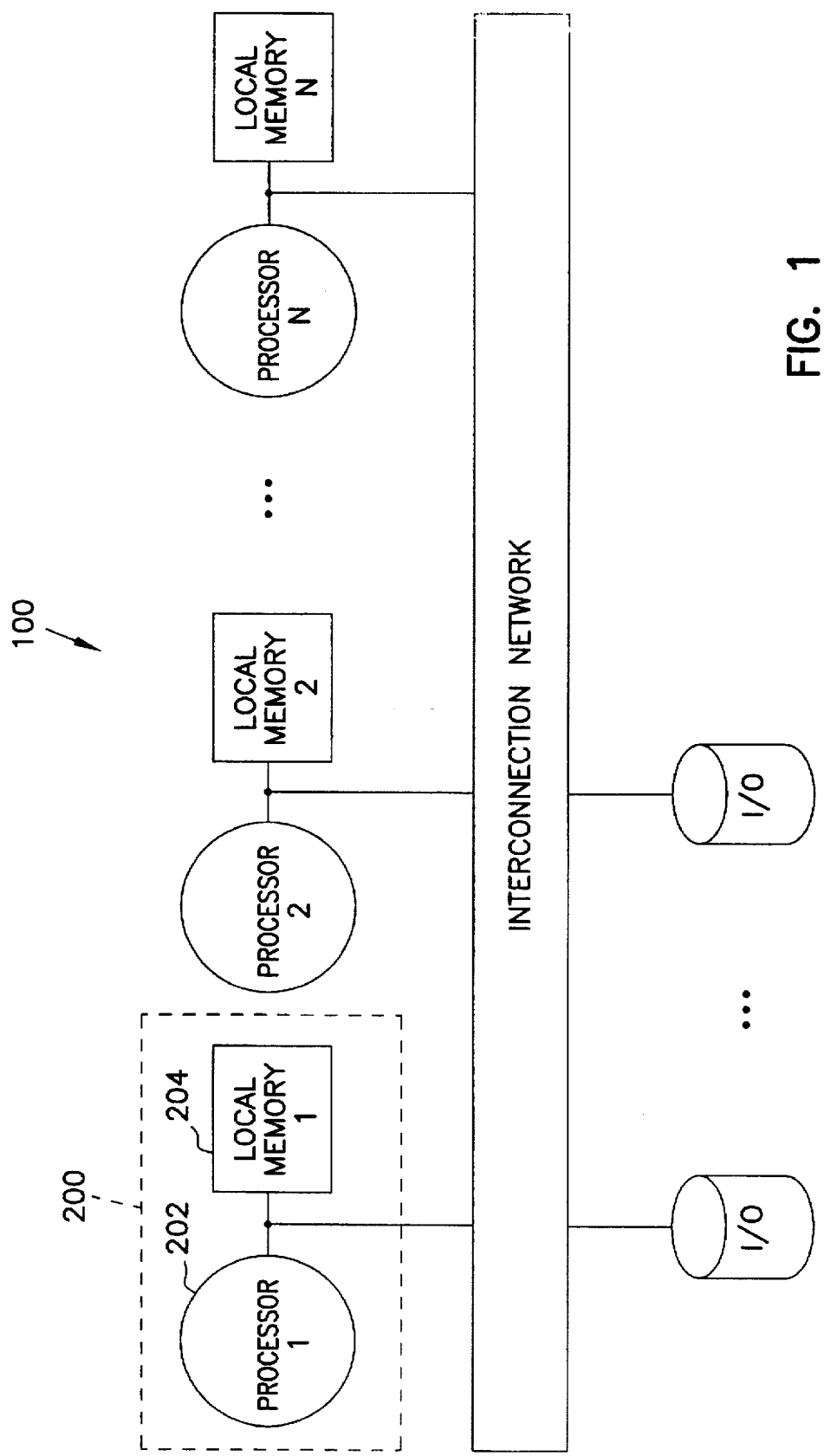
FIG. 1 is a simplified block diagram illustrating an exemplary multiprocessor system 100 on which the barrier-eureka synchronization (BES) architecture of the present invention can be used.

FIG. 1 is a simplified block diagram illustrating an exemplary multiprocessor system 100 on which the present barrier-eureka synchronization (BES) architecture can be used. Multiprocessor system 100 is comprised of a plurality of physical nodes 200. Each physical nodes 200 is comprised of at least one processor 202, local memory 204, and an interface which can be thought of as a portion of the interconnection network. In one exemplary embodiment, local memory 204 is globally addressable by each processor 202, but physically distributed among physical nodes 200, with between 64 megabytes and 512 megabytes per node, and the number of physical nodes 200 is up to approximately 2048 nodes. In one such exemplary embodiment, spare nodes and "pass-through" nodes are added to multiprocessor system 100 as well. Multiprocessor system 100 is also comprised of a plurality of input/output (I/O) devices 300 such as high-performance disk-drive subsystems, tape subsystems, communications subsystems, and/or user terminals, connected to input/output (I/O) channels capable of transfer rates up to 500 megabytes per second.

Figure 2:
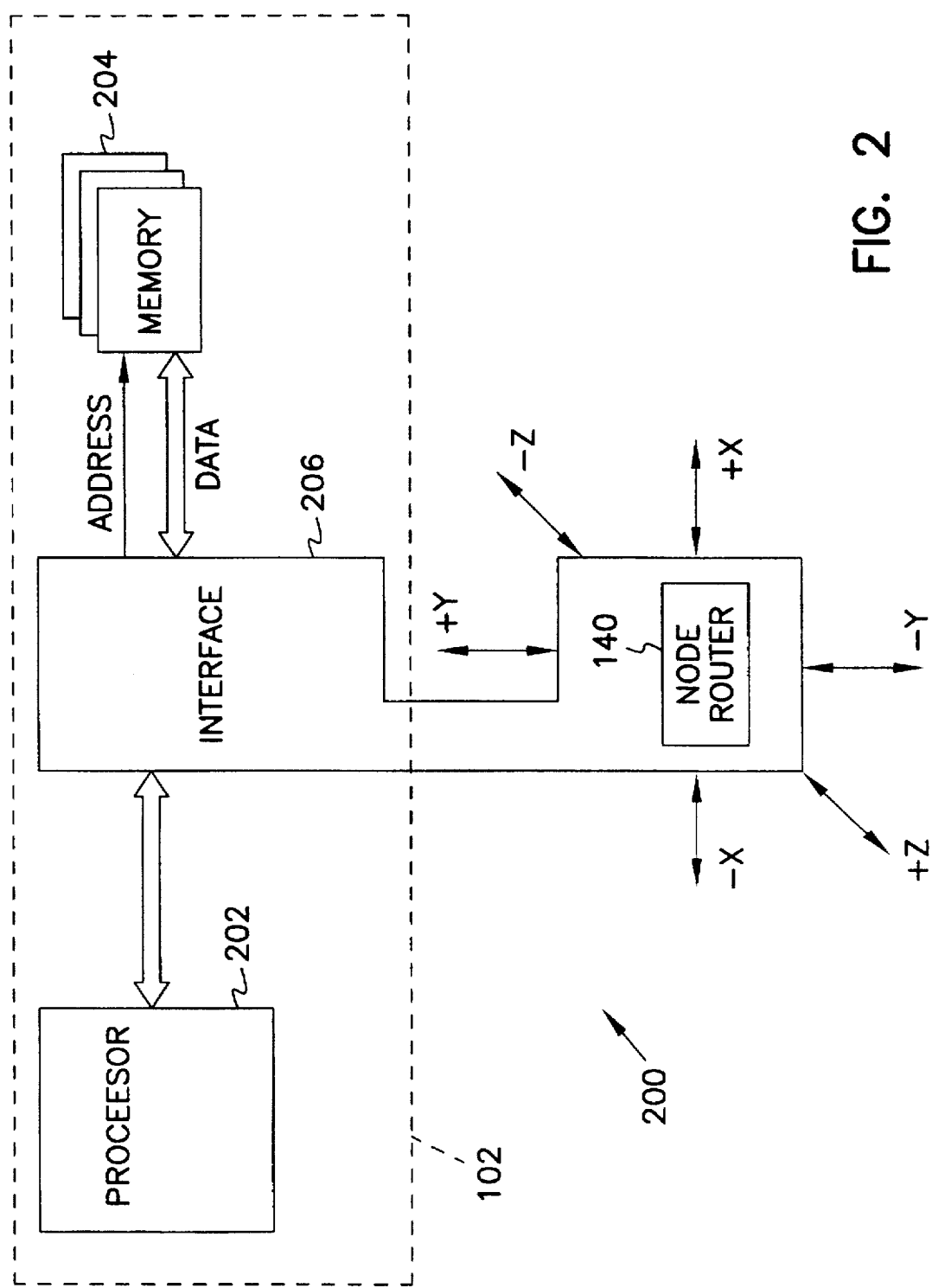
FIG. 2 is a simplified block diagram illustrating an embodiment of a physical node 200 comprised of a node router 140 and processing element (PE) 102 including processor 202, interface-and-network router 206, and local memory 204.

FIG. 2 is a simplified block diagram illustrating an embodiment of a physical node 200 comprised of a node router 140 and processing element (PE) 102, the PE 102 which includes processor 202, interface-and-network router 206, and local memory 204. In this embodiment shown in FIG. 2, interface-and-network router 206 includes node router 140.

In general, a "processing element" (also called a "processing entity") (PE) 102 is defined as a computational entity which executes a PE program. The PE program is generally part of a larger program (also called the "application") which executes an software program applied to a specific use for a user. PEs 102 can be, but need not be, separate pieces of hardware (e.g., individual nodes 200 of an MPP system 100), and can also be implemented as a plurality of processes, threads, tasks, or other program elements which run on a single hardware processor or on a plurality of hardware processors connected by a network. A plurality of PEs 102 can share a single piece of hardware, such as processor 202 and memory 204, in a time-slice manner. In another embodiment, a plurality of processors 202 can simultaneously execute as a single PE 102 in a vector-processing manner. Thus, a PE 102 and a processor 202 can be but need not be co-extensive.

A "BES entity" (sometimes also called a "synchronization tree") is defined as the set of PEs 102 which are grouped together, preferably by software configuration operations, to synchronize on a particular barrier or eureka event or a hybrid set of barrier/eureka synchronization events.

Figure 3:
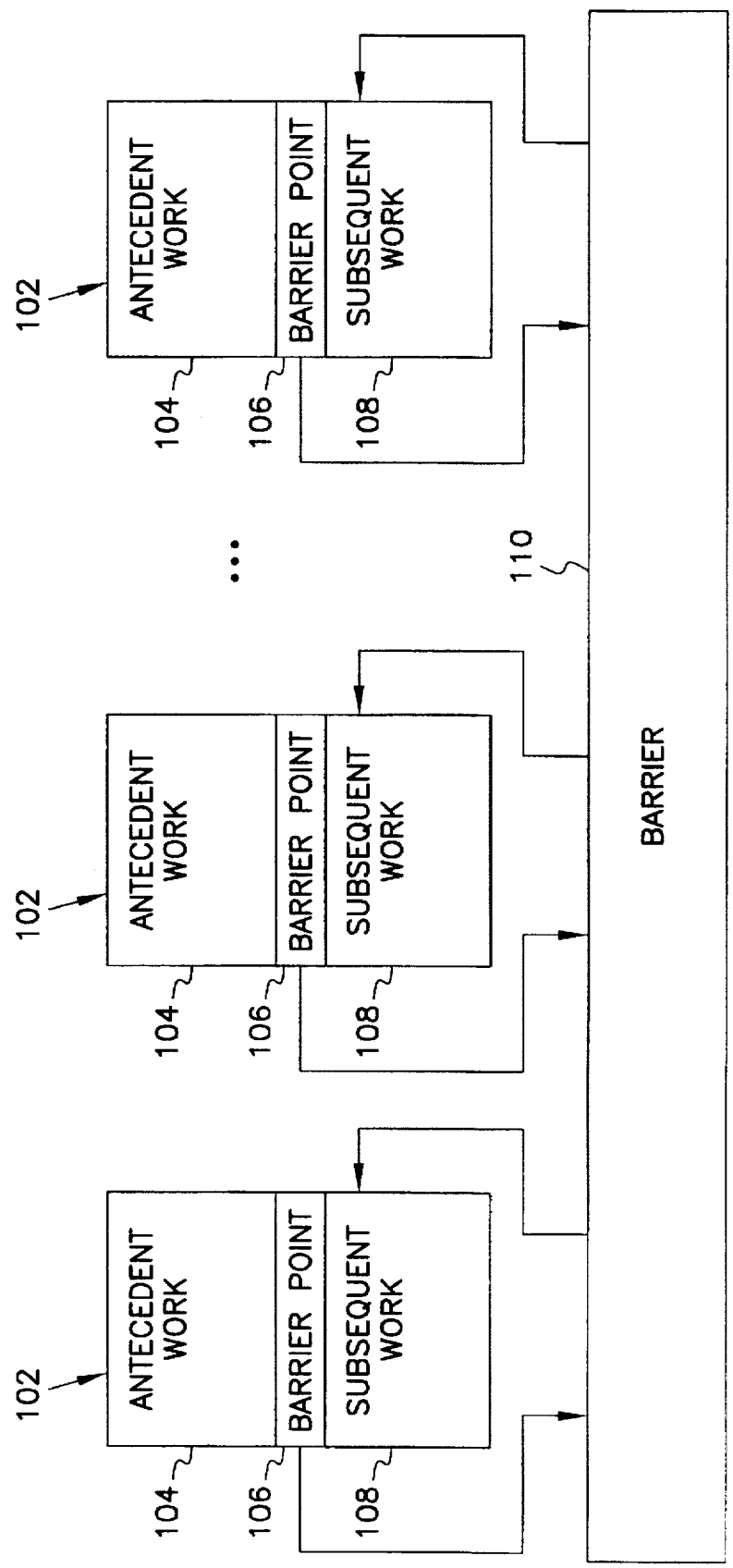
FIG. 3 is a schematic diagram illustrating the software flow at a barrier synchronization point 106.

FIG. 3 is a schematic diagram illustrating the software flow at a barrier synchronization point. In general, several job instantiations 103 operate simultaneously within multiprocessor system 100. This simultaneity can mean a method of operation where job instantiations 103 operate in separate PEs 102 which operate at the same time, or it can mean that certain job instantiations 103 operate in a time-multiplexed manner within a single PE 102, or it can mean a combination of these previous two methods. Within each job instantiation 103, there is antecedent work 104 which is performed until some condition is detected in the program code which causes the signalling of a barrier point 106. Barrier point 106 causes that job instantiation 103 to wait at barrier 110 until all other job instantiations 103 reach their respective barrier point 106, and thus join barrier 110.

As soon as the particular job instantiation 103 running on a particular PE 102 joins the barrier 110, that PE 102 is then available to start work on another job instantiation 103. For example, suppose a computational task can be divided into eight parts and further that four PEs 102 are available to work on this task. Four job instantiations 103 could then begin on the antecedent work 104 of four of the eight parts of the task. As each processor reached its individual barrier point 106, it would join barrier 110, swap out the current job instantiation 103 (which can proceed no further until all eight job instantiations 103 join barrier 110), and swap in a new job instantiation 103 to process the next of the eight parts. Once all eight job instantiations 103 reached barrier 110, the four PEs 102 can continue to finish the subsequent work 108 of four job instantiations 103. Such a scheme can provide more efficient utilization of computational resources than were eight PEs 102 to be used, in which case seven PEs 102 could be waiting idle at barrier 110 until the last PE 102 finally reached its own barrier point 106 and joined barrier 110. On the other hand, maximum performance can often be achieved by using as many parallel-operating PEs 102 on a problem as possible. For simplicity, this patent disclosure will equate a job instantiation 103 with the PE 102 on which it is running, unless it is clear from the context that the two are distinct.

Figure 4:
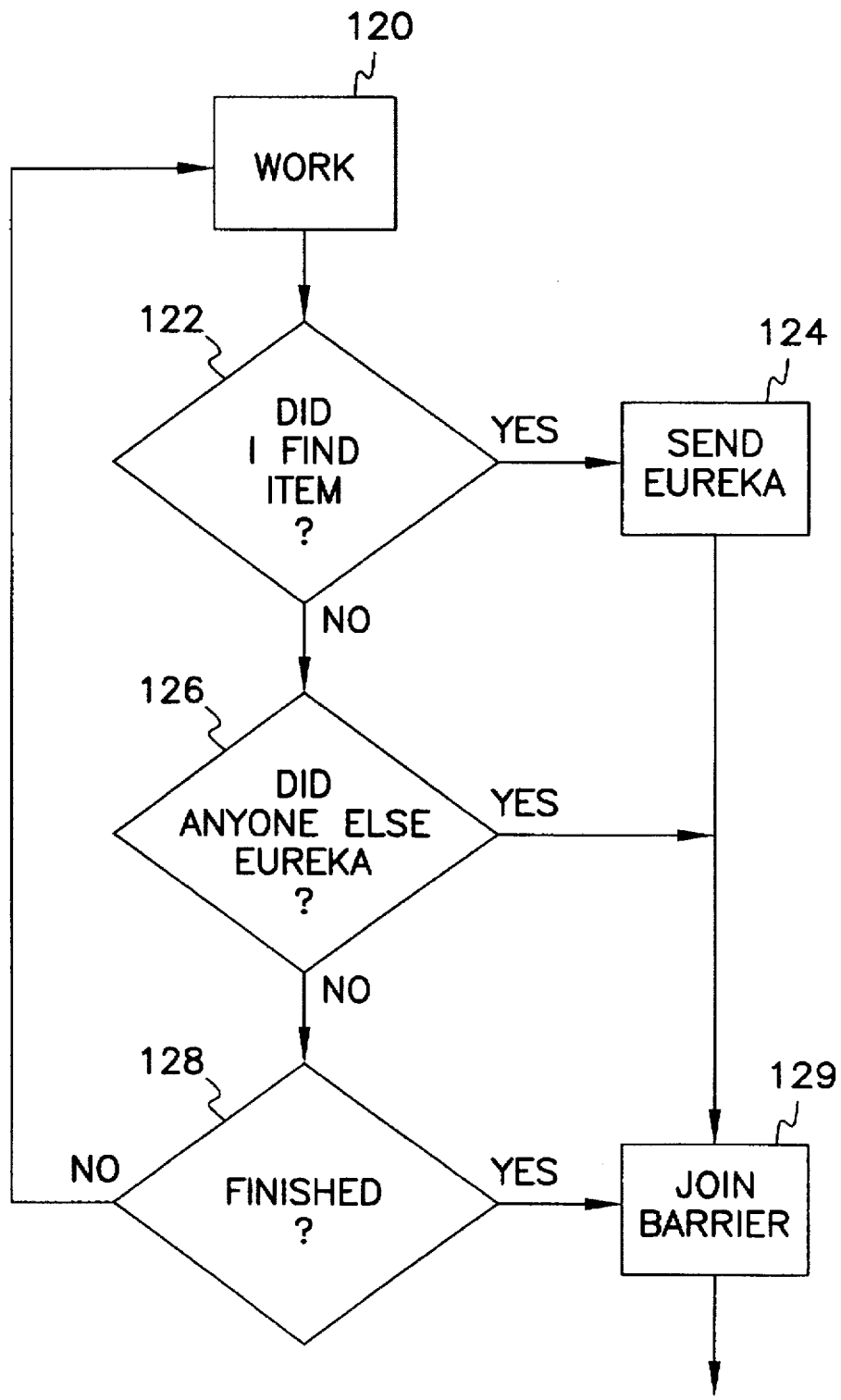
FIG. 4 is a flow diagram of the software running in one PE 102 which uses both barrier and eureka synchronization.

FIG. 4 is a flow diagram of exemplary software running in one PE 102 which uses both barrier and eureka synchronization. At block 120, computational work is done; for example, searching for an item in a portion of a database. Periodically, at block 122, a test is performed to determine whether the item being sought has been found, and if so, a control is passed to block 124 and a "eureka" is sent to all other PEs 102 which are also searching for the same (or another corresponding) item in other portions of the database; then control is passed to block 129, and this PE 102 joins the barrier 110. If, at block 122, the item has not been found by this PE 102, then control passes to block 126, where a test is made to determine whether any other PE 102 has sent a eureka which that PE 102 found its item, and if so, control is passed to block 129, and this PE 102 joins the barrier 110. If, at block 126, no other PE 102 has sent a eureka, control is passed to block 128, and a test is made to determine whether this PE 102 has finished searching its portion of the database; and if so, control is passed to block 129, and this PE 102 joins the barrier 110. If, at block 129, this PE 102 has not finished searching its portion of the database, control is passed back to block 120, and work continues as above.

Figure 5:
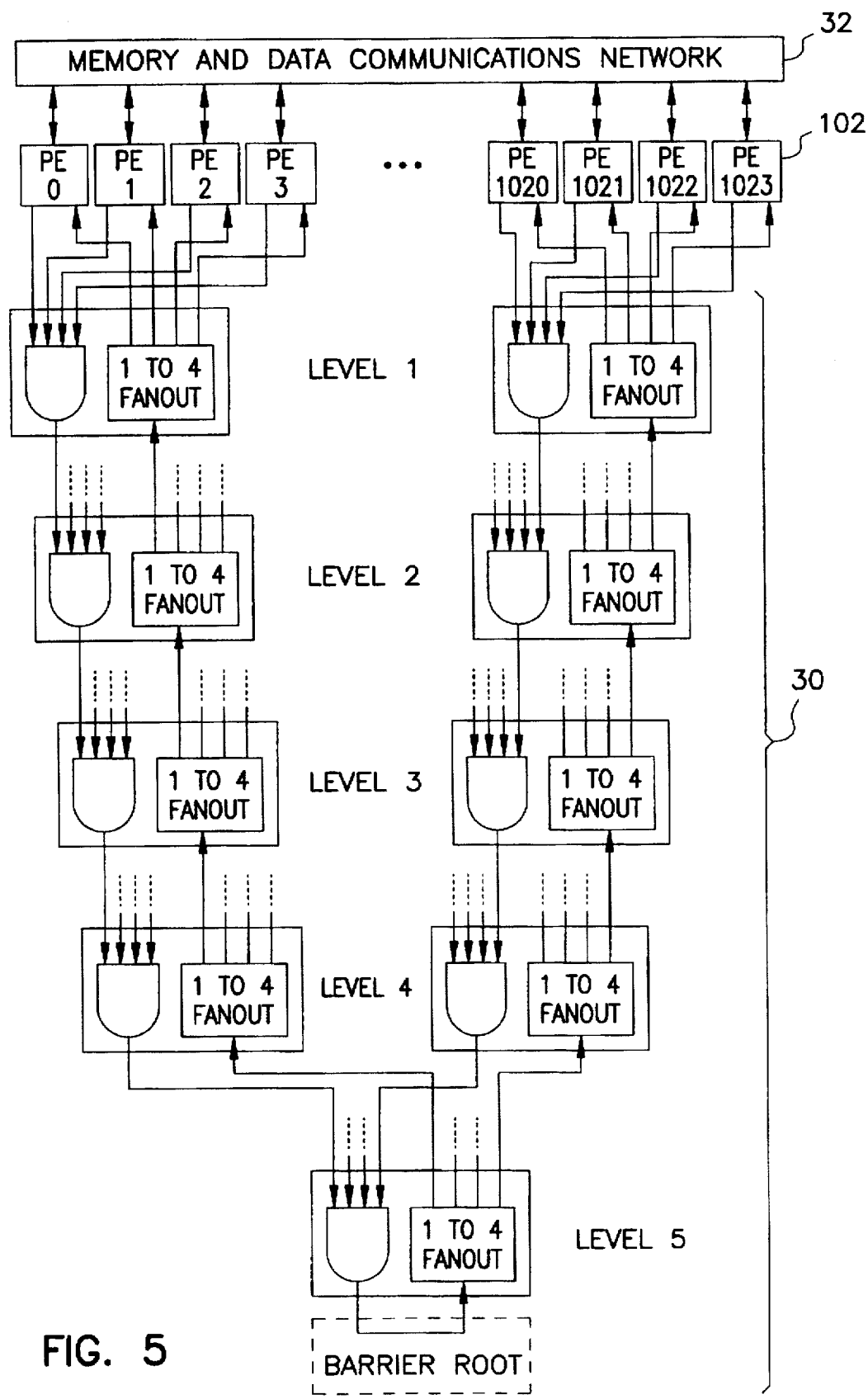
FIG. 5 is a topology diagram of a hardwired barrier-synchronization circuit for barrier synchronization, which can also be used for eureka synchronization using negative logic.

FIG. 5 is a topology diagram of an exemplary hardwired barrier synchronization circuit (which can also be used for eureka synchronization using negative logic). Such a circuit is described in copending and commonly assigned application Ser. No. 08/165,265. Communications network 32 is used for normal memory and data communications traffic between the plurality of processors 102. In one exemplary network, one thousand twenty-four (1024) PEs 102 are connected in a three-dimensional torus network. The PEs 102 also communicate through a separate physical barrier/eureka network 30 which has hardwired fanin circuits 33 and fanout connections 34. At any level, (e.g., one of levels 1 through 5) the output of the fanin circuit 33 can be connected to the corresponding fanout connection 34, allowing a limited customization of the tree. In the example shown, the fanin circuit 34 is connected to the fanout 34 at level 5, thus connecting all 1024 PEs 102 into a single barrier.

Figure 6:
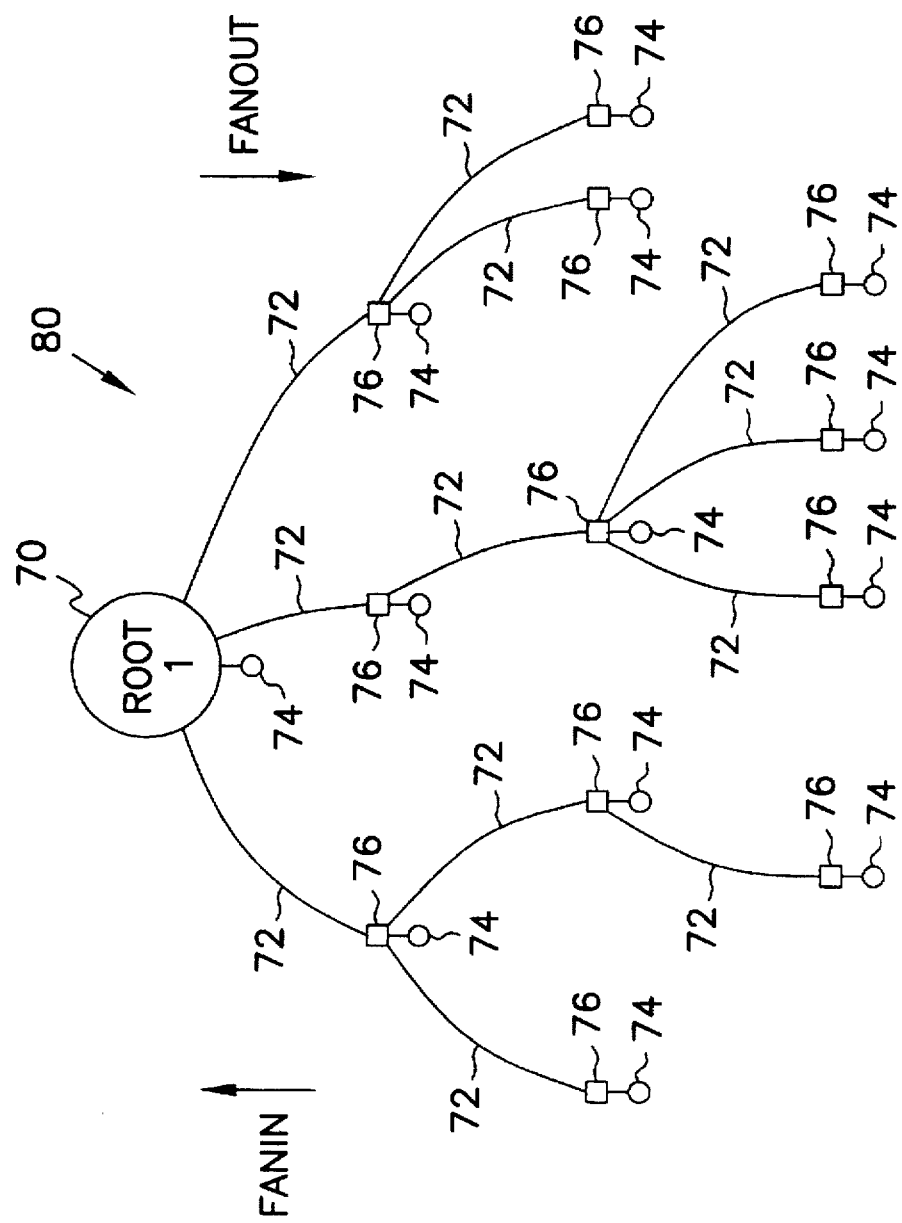
FIG. 6 is a topology diagram of an exemplary configured BES entity 80.

FIG. 6 shows the connection topology for an exemplary embodiment of a BES entity 80. BES entity 80 has a plurality of leaves 74, a single root 70, and a set of branches 72 connecting leaves 74 to root 70 through intermediate internal nodes 76. In one embodiment, referring to FIG. 2, each leaf 74 can be thought of as operating within a PE 102, branches 72 can be thought of as being programmable connections operating in node router 140 to other node routers 140. "Barrier events" and/or "eureka events" travel ("FANIN") from the leaves 74 to the root 70, and then travel ("FANOUT") back to the leaves 74. The FANOUT path preferably traces back the same paths (but in the opposite direction) that the FANIN paths took towards the root (but the FANOUT path need not go back along the same paths, nor go back to the same leaves).

Figure 7:
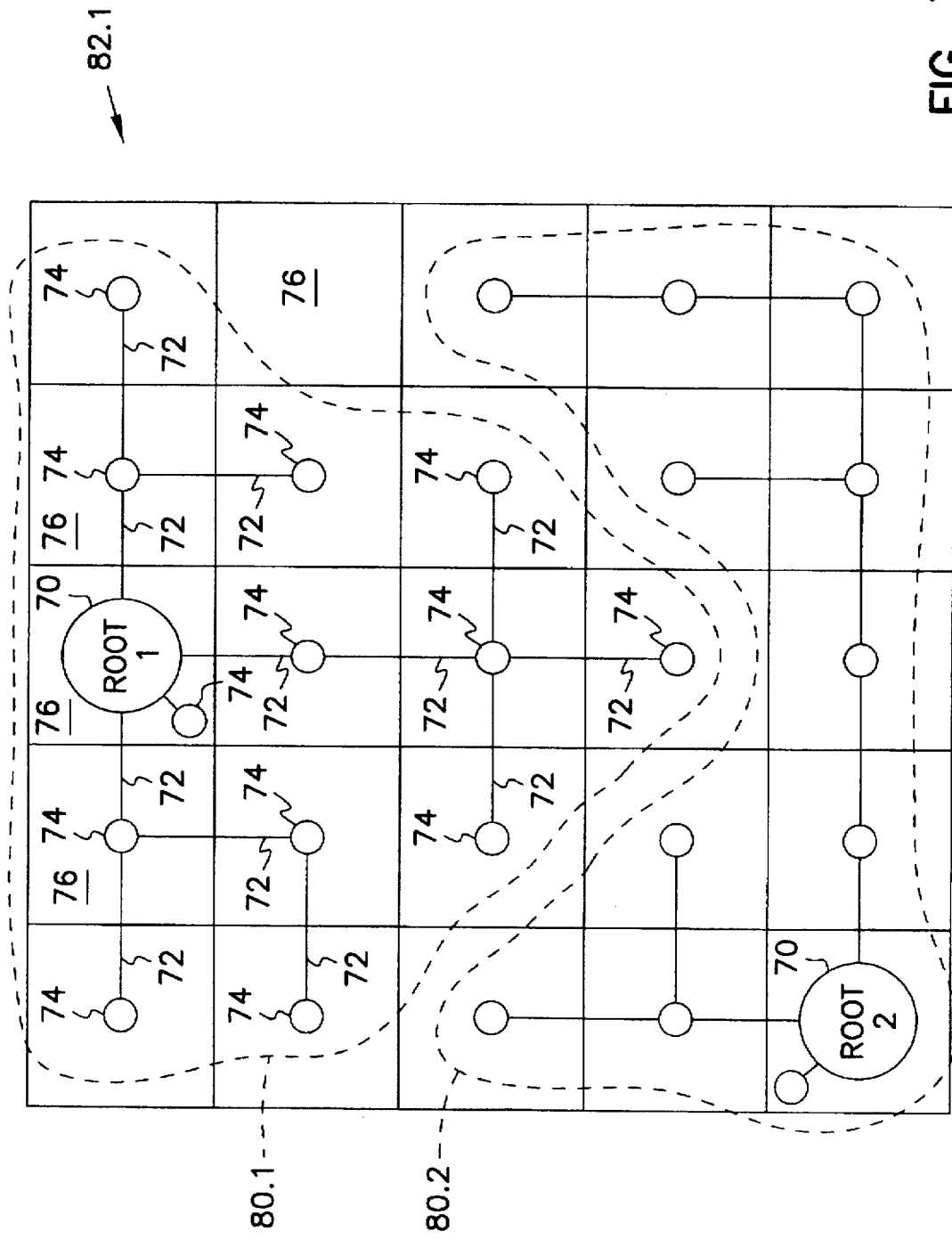
FIG. 7 is a topology diagram of two exemplary BES entities 80.1 and 80.2 as configured in an exemplary 2-D BES domain 82.

Referring to FIG. 7, a BES domain 82 (also called a "BES context", but the term "BES domain" is preferred for this description of the invention in order to avoid confusion with "program contexts" used to designate aspects of the multi-tasking program environment which are saved and restored as part of task switching) is a mechanism within which one or more BES entities 80 can be implemented simultaneously. In one embodiment, each such BES entity 80 operating within a single BES domain 82 is non-overlapping (relative to other BES entities 80 within that same BES domain 82), and has its own root 70, branches 72 and leaves 74, none of which are shared by another BES entity 80 operating within that same BES domain 82. FIG. 7 shows a schematic representation of one such exemplary embodiment of a BES domain 82 having two BES entities 80.1 and 80.2 as implemented on a five-by-five two-dimensional (2-D) array of PEs 102. BES entity 80.1 in FIG. 7 is similar to the single BES entity 80 of FIG. 6; however, as shown in FIG. 7, up to N non-overlapping BES entities 80.1 through 80.N can simultaneously co-exist (though only 80.1 and 80.2 are shown in exemplary FIG. 7), operating within a single BES domain 82. Each square represents a node 76 and the BES domain of one PE 102 which is connected (in this simplified exemplary embodiment) to four adjacent PEs 102, one on each side of the square. In an alternative preferred embodiment, a three-dimensional (3-D) array of PEs 102 is used and connected as a 3-D torus for multiprocessor system 100, wherein each PE 102 is coupled bi-directionally to each of six adjacent PEs 102, represented as one connection on each face of a cube. In one such embodiment, up to 2048 PEs 102 can be connected in a 32×8×8 processor 3-D torus network (plus spare processors, and one I/O port, capable of transfer rates up to 500 megabytes per second, for every four processors, wherein any processor can use any I/O port), with each PE 102 having a high-performance RISC processor, such as the EV5 ALPHA processor by DEC, for processor 202.

Figure 8:
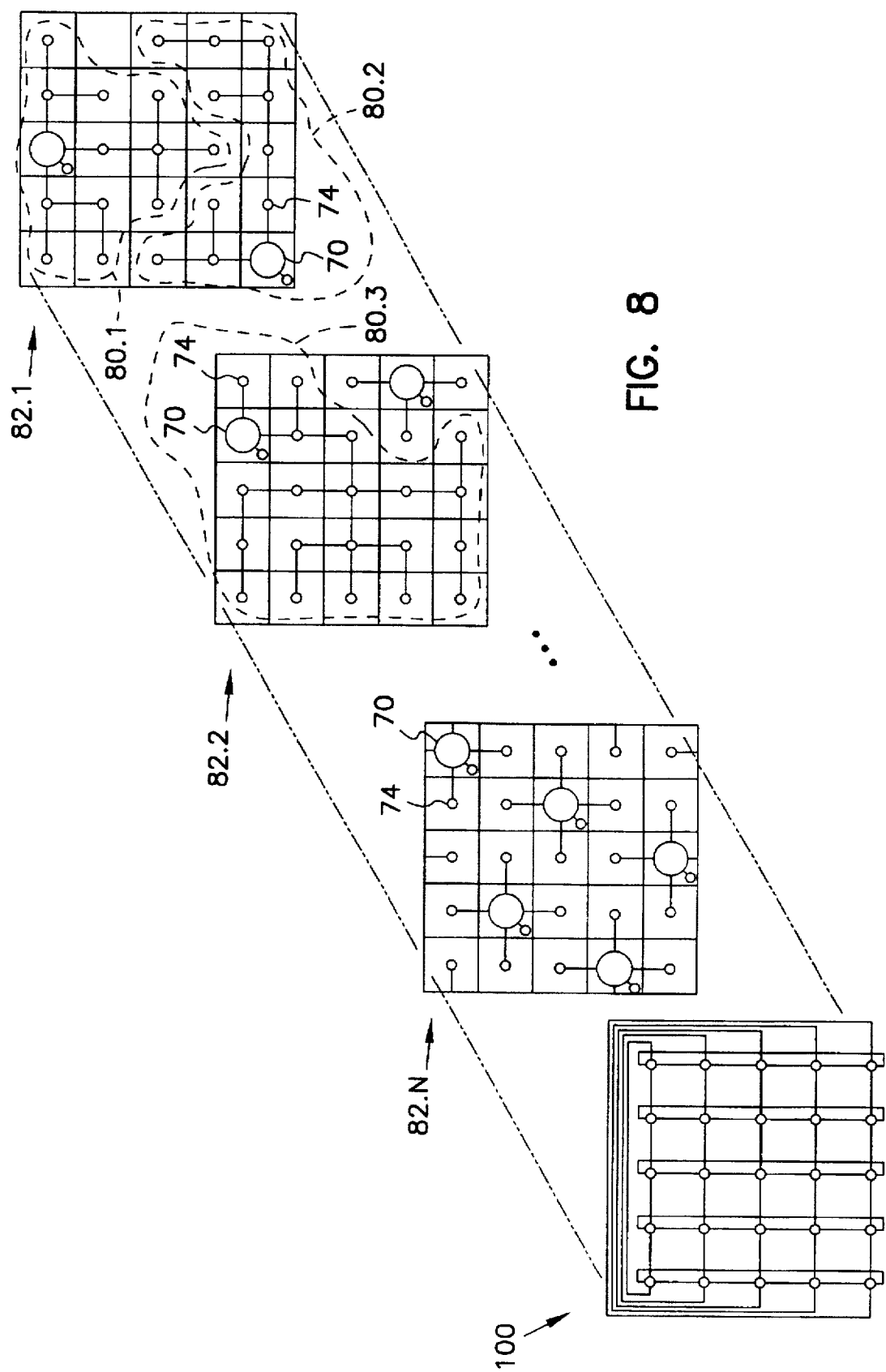
FIG. 8 is a topology diagram of three exemplary BES entities 80.1, 80.2, and 80.3 as configured in two exemplary 2-D BES domains 82.1 and 82.2 which are running on an exemplary 2-D multiprocessor system 100.

In one simple exemplary embodiment, shown schematically in FIG. 8, parallel-processing multiprocessor system 100 supports a plurality of overlapping and co-existing BES domains 82.1 through 82.N. BES domain 82.1 in FIG. 8 is similar to the single BES domain 82 of FIG. 7; however, as shown in exemplary FIG. 8, up to N overlapping BES domains 82.1 through 82.N can simultaneously co-exist, operating within a single system 100. The example parallel multiprocessing system 100 in FIG. 8 is connected as a 2-D toroid array of PEs 102. While BES entities 80 within a single BES domain 82 do not overlap (e.g., BES entity 80.1 does not overlap BES entity 80.2), BES entities 80 in separate BES domains 82 are independent, and are allowed to overlap BES entities 80 in other separate BES domains 82 operating in parallel (e.g., BES entity 80.3 does overlap both BES entities 80.1 and 80.2, but is in a separate BES domain 82.2). In an alternative preferred embodiment, a three-dimensional (3-D) array of PEs 102 is used and connected as a 3-D torus for multiprocessor system 100, wherein each PE 102 is coupled bi-directionally to each of six adjacent PEs 102, conceptually represented as one connection on each face of a cube. In one such embodiment, up to 2048 PEs 102 can be connected in a 3-D torus network, with each PE 102 having a high-performance RISC processor, such as the ALPHA processor by DEC, for processor 202.

Two key forms of synchronization between PEs 102 are barrier synchronization and eureka synchronization.

The BES architecture of the present invention provides the user a BES interface with a full suite of operations. These operations allow each BES entity 80 to be used as barrier or eureka, or both barrier and eureka simultaneously. Barriers and eurekas may both be simultaneously in flight on the same BES entity 80. Barriers are immediately reusable after completion of the barrier. Eurekas are immediately reusable after completion of a barrier (on the same BES entity) indicating that the eureka has been received by all participating PEs 102. Processor interrupts may optionally be generated upon receipt of eureka or barrier completion events. PEs 102 may also poll to determine whether a eureka or barrier completion has occurred.

Using special-purpose BES configuration registers, the interface-and-network routers 206 of the data-communication network are configured to implement FANIN and FANOUT trees of BES entities 80, and interpret/deliver special messages driving the FANIN and FANOUT trees. Only communication between directly-connected network nodes is required because configuration information is stored and maintained at each node along the path from the leaves 74 to the root 70 (FANIN) and from the root 70 to the leaves 74 (FANOUT). The leaves 74 of the BES entities 80 (comprised of PEs 102) are the participants in the synchronization activity; they provide the user-view of the BES entity 80. In one embodiment, the internal nodes 76 of the BES entity 80 are implemented using interface-and-network routers 206 that transparently implement the user-view of the BES entity 80. (I.e., once initialized, interface-and-network routers 206 operate without the need for further intervention from processor 202, and are thus "transparent" to programs running in processor 202.) The BES entity 80 can have leaves 74 at varying heights (a "leaf height" is the number of nodes between the root 70 and the leaf 74), and the FANIN and FANOUT trees need not be symmetrical in any way, nor do they require any particular network topology; the only network restriction in the preferred embodiment is that there exist a communication path from each PE 102 to all other PEs 102 which are part of the particular BES entity 80. Since the BES architecture of the present invention requires very little storage, all the required state and configuration information to implement the FANIN and FANOUT trees can be contained directly within the interface-and-network routers 206 of the communication network (thus not taking processor storage), and the barrier messages that flow through the communication medium need not share the buffering needed for the normal data-message traffic. Hence, the messages that implement the barrier/eureka FANIN and FANOUT trees can travel independently of the normal messages that traverse the communication medium; their only interaction is that they share the physical communication medium. In one embodiment, one message is passed on every communications link in the network on every clock cycle. In one such embodiment, BES messages are given high priority and data communications are given moderate priority. In one such embodiment, run-time network diagnostic messages (used to monitor network integrity when the network is not otherwise being used) are given low priority. If no communications functions are occurring at a particular clock cycle on a particular communications link, then blank "placeholder" messages are passed on that link.

A typical barrier operation flows toward the root 70 of the BES entity 80 as PEs 102 join the barrier, and reaches the root once all PEs 102 which are members of that BES entity at that time have joined; then the barrier-completion notification is fanned out along the fanout tree toward the leaves. A typical eureka operation flows immediately to the root and is then immediately fanned out to the leaves. Each interface-and-network router 206 node needs only to maintain a few bits of state information, and some configuration bits to define the connection topology of the BES entity 80 (one bit of configuration information for each "child" of the node and a few bits to determine the parent of the node).

Due to the flexibility of the configurations, any subset of the PEs 102 on communications network 32 can be selected to participate in the barrier and/or eureka of BES entity 80. Multiple BES domains 82 allow for multiple overlapping active BES entities 80. Individual BES domains 82 allow any subset of connected PEs 102 to participate in a particular configured BES entity 80. In addition, each BES domain 82 can implement BES entities 80 ("trees") for multiple groups of PEs 102, provided the trees for the different PE groups do not overlap.

Some of the specific solutions the invention provides are:
very fast barrier/eureka implementation;
low-cost dual use of communications network 32 to serve both barrier and normal message traffic;
flexible barrier/eureka functionality;
multiple BES domains 82;
flexible partitioning of BES domain 82 into BES entities 80; and simultaneous barrier/eureka usage in each BES entity 80.

FIG. 3 shows the flow of a typical application program using barrier synchronization. Barrier 110 is a common synchronization point for a group of PEs 102. A barrier point subroutine or instruction used to implement the barrier 110 is inserted into each PE program running in each respective PE 102 which is a member of the BES entity 80. The programmer writing the application knows that once the barrier 110 completes, all antecedent work 104 will have been completed on all participating PEs 102 up to their individual barrier points 106, and no subsequent work 108 will have started on any PE 102 which is participating in (or a member of) that BES entity 80. Thus, after completion of the barrier 110, the application continues and the programmer can infer some behavioral properties. Typically, a barrier 110 has two phases. The first phase involves joining the barrier 110. The second phase involves waiting for the barrier 110 to complete by all other PEs 102 in the BES entity 80 joining the barrier 110.

One usage of eureka synchronization is for a parallel search. FIG. 4 shows one embodiment of the control flow for one PE 102 in a parallel-search application. The main loop has each of the PEs 102 performing work (antecedent work 104) at block 120 (which in this case is searching for an item), each PE 102 checking to determine whether that PE 102 found the item being searched for at block 122, whether any of the other processors found the item at block 126, or if that PE 102 has finished at block 128. After each PE 102 has finished performing its own work (e.g., has exhausted the list of items it was searching), that PE 102 joins a barrier at block 129 with all other finished processors. As soon as one of the processors finds the item searched for, it sends a eureka at block 124 to the other processors. All processors quickly receive the eureka (either at the test at block 126, or perhaps as the result of an interrupt to a PE 102 at the barrier), and the search can be quickly terminated. Note that the protocol works still correctly with any number of processors reaching block 124 substantially simultaneously and each sending eurekas.

Figure 9:
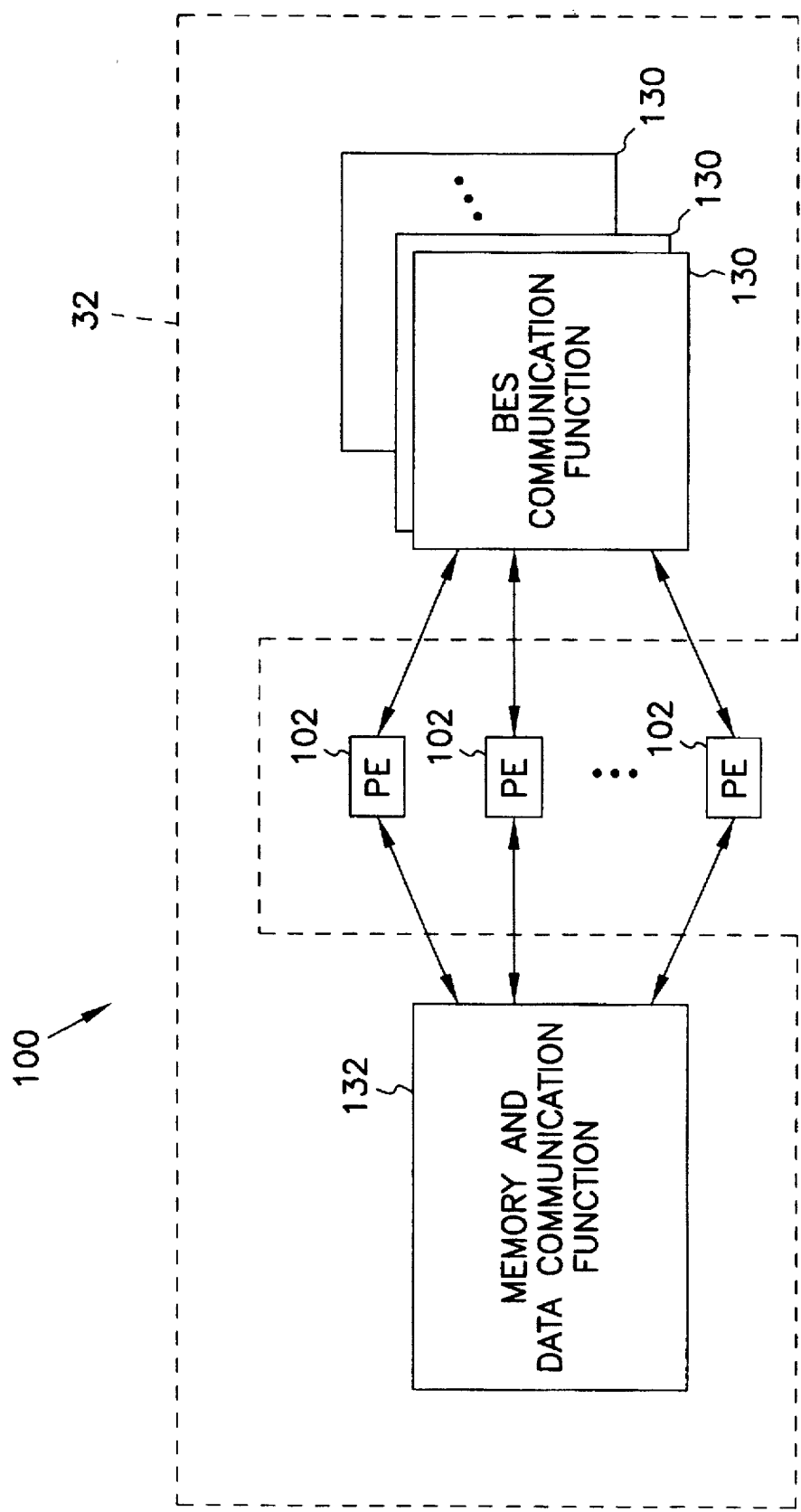
FIG. 9 is a block diagram of an exemplary multiprocessor system 100 including both memory and data-communication function 132 and BES communication function 130.

FIG. 9 shows a conceptual view of the system topology. PEs 102 communicate either by barrier/eureka synchronization communication function 130, or by whatever other communication paths exist in memory and data-communication function 132. A plurality of parallel BES communications functions 130 may be implemented to meet the needs of users of the multiprocessor system 100. (The other communication paths in memory/data-communication function 132 may have other communication/synchronization forms.) In one exemplary embodiment of the present invention, both of these functions are implemented within communication network 32.

The present invention has several advantages over other systems. First, other systems (e.g., the system shown in FIG. 5 and used in the Cray T3D MPP system manufactured by Cray Research Inc., the assignee of the present invention) have physically separate networks (e.g., a communications network 32 is separate and independent of a physical barrier/eureka network 30, both as shown in FIG. 5) for the two types of communication functions (i.e. memory and data-communications function 132, and BES communications function 130, respectively) shown in FIG. 9. This adds costs to those systems for extra input/output pins and wiring. The present invention allows the barrier/eureka synchronization communication function 130 to communicate via the (possibly asynchronous) communication network 32, resulting in a more efficient and cost-effective design. The implementation can be readily adapted to any arbitrary communication topology that allows FANIN and FANOUT trees to be created with the physical or virtual links. Since there is very little required state information, it is possible to hold the full state information of the trees on the individual interface-and-network router 206 at each of the nodes that implement communication network 32. In one embodiment, each of the nodes that implement communication network 32 includes special-purpose registers and control logic in order The second advancement from other barrier systems is the flexibility-of-use. Each barrier/eureka synchronization entity (BES entity 80) can perform either barriers, eurekas, or both simultaneously. Additionally, interrupts can be generated at critical points.

Figure 10:
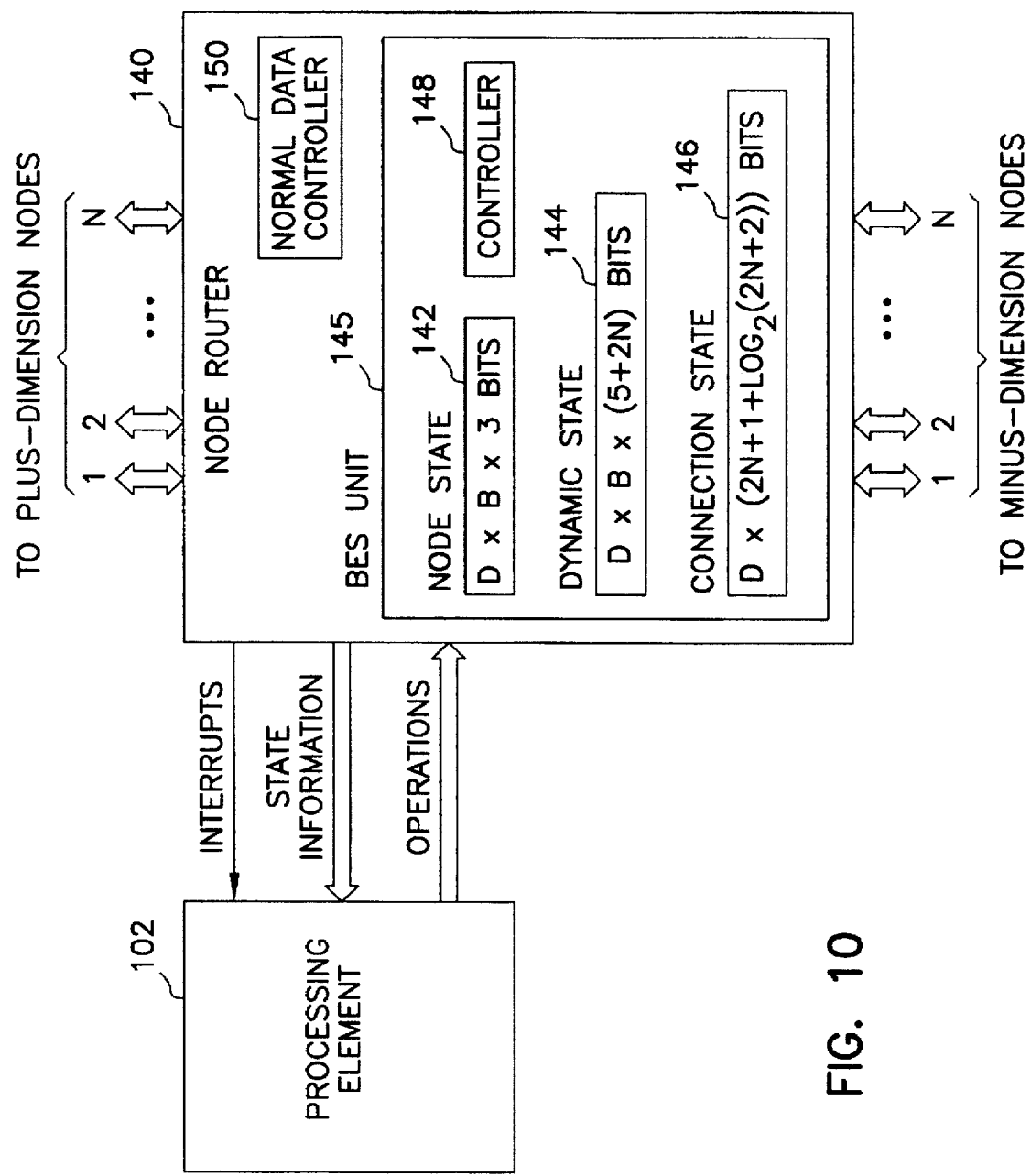
FIG. 10 is a block diagram of an embodiment of a physical node of multiprocessor system 100 showing generalized blocks of the BES state information.

FIG. 10 shows the communication and state information required next to a PE 102 (in this embodiment, the communication and state information is within node router 140) for one node of the system. BES unit 145 contains the state information and controller logic for the BES entities 80. One embodiment allows multiple BES entities 80 within a system for multiprogramming purposes. In one embodiment, PE 102 communicates with BES unit 145 via memory-mapped loads and stores.

In one embodiment, BES unit 145 includes node state 142 having D×B×3 bits, where D represents the number of BES domains 82, B represents the number of barriers in each BES domain 82, and the 3 bits encode the BES unit state as shown in the barrier/eureka synchronization states of FIG. 18 for each domain and barrier. In one such embodiment, D is thirty-two (32), supporting thirty-two BES domains, and B is one, supporting one barrier in each BES domain 82. In another such embodiment, D is thirty-two (32), supporting thirty-two BES domains, and B is two, supporting two barriers in each BES domain 82.

In one embodiment, BES unit 145 also includes dynamic state 144 having D×B×(5+(2×N)) bits, where D represents the number of BES domains 82, B represents the number of barriers in each BES domain 82, N represents the number of dimensions in the network (e.g., a k-ary n-cube network), and the bits encode which children have joined the BES barrier from the FANIN tree, and which children have been sent the BES barrier-completion signal on the FANOUT tree.

In one embodiment, BES unit 145 includes connection state 146 having D×(1+(N×2)+log$_2$((N×2)+2)) bits, where D represents the number of BES domains 82, N represents the number of dimensions in the network, and the bits encode the location of the link connections to the BES unit's parent and children.

A memory-mapped load operation returns the current state of BES unit 145 to PE 102 running in processor 202. A memory-mapped store operation forwards "operations" (commands) from processor 202 to BES unit 145. BES unit 145 also communicates to processor 202 via an interrupt mechanism which is triggered upon receipt of a eureka or barrier-completion signal. FIG. 10 also depicts how one embodiment of BES unit 145 communicates with the FANIN/FANOUT trees.

Figures 19, 20:
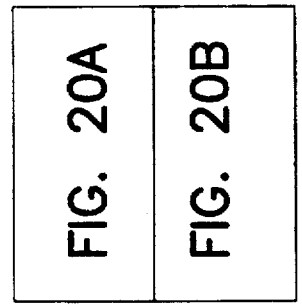
FIG. 19 is a table of BES unit operations.
FIG. 20 shows the placement of FIGS. 20A and 20B side-by-side to form a single table.

FIG. 18 describes the user-visible states of one embodiment of an individual BES unit 80. FIG. 19 describes the user-visible operations which are implemented in one embodiment of PE 102 to change the BES entity state and cause the synchronization operation to be performed.

FIG. 20 (a table which is comprised of FIGS. 20A and 20B side-by-side) shows the BES entity states and operations that, in one embodiment, are used by the user to implement a barrier (in this embodiment, some other states exist in the tree to implement the message passing used to provide the user-visible states and operations; see e.g., FIGS. 14 and 15 which show internal states not visible to the user). In one embodiment, this state information is stored in the C-chip shown in FIG. 11. A simple barrier is an S_BAR→S_ARM→S_BAR transition. The S_BAR→S_ARM transition occurs as PE 102 executes an OP_BAR operation. This is the indication from PE 102 to barrier control means to cause the PE 102 to join the barrier. The S_ARM→S_BAR transition occurs as all PEs 102 join and the barrier propagates down the FANIN tree and up the FANOUT tree. The S_IDLE state can also be used as a third state for the simple barrier (via OP_CLEAR). This can be particularly useful with barrier interrupts to indicate that the barrier has been "seen". In all other aspects, S_BAR and S_IDLE are equivalent.

Figure 16:
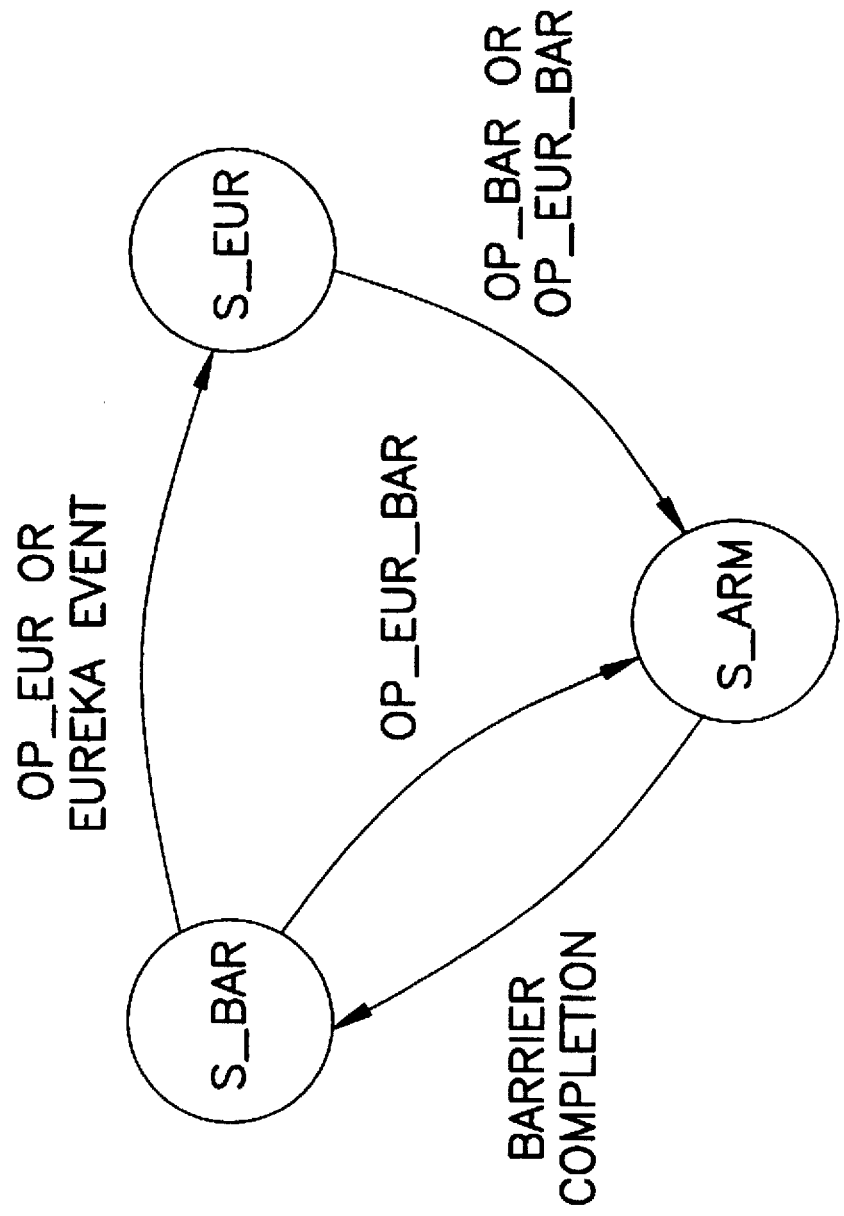
FIG. 16 is a state transition diagram of simple eureka transitions.

FIG. 16 shows the three-state transition, as seen by a user in one embodiment, for a simple, reusable eureka (other transitions, as shown in FIGS. 14 and 15, implement the message passing used to provide the user-visible transitions). The barrier synchronization that is inherent in or folded into the eureka operation makes the eureka immediately reusable. Each PE 102 starts in the S_BAR (S_IDLE) state. One (or more) of the processors execute OP_EUR_B. This sends the eureka, changing the other states to S_EUR. As each processor "sees" the eureka, that processor joins the subsequent barrier (to indicate that it has "seen" the eureka). This leaves the state for all processors in S_ARM momentarily until the barrier completes, which then moves the state to S_BAR.

The processors can receive interrupts from the BESU. The OP_INT operation enables interrupt upon receipt of a eureka event. The OP_BAR_I operation both arms the barrier and enables an interrupt on completion. The S_EUR_I is equivalent to the S_EUR state except that it indicates that an interrupt was sent. The S_BAR_I is equivalent to the S_BAR state except that it indicates that an interrupt was sent.

Table 1, below, shows the operations that are sent down the FANIN tree. Note that FI_EB indicates that the eureka occurred first, followed by the barrier.

TABLE 1

| FANIN operations | |
| --- | --- |
| FI_E | Issue Eureka |
| FI_B | Issue Barrier |
| FI_EB | Issue Eureka, Issue Barrier |

Table 2, below, shows the FANOUT tree operations. Note that FO_BE indicates that the barrier completed first, followed by a subsequent eureka event.

TABLE 2

| FANOUT operations | |
| --- | --- |
| OF_E | Eureka Received |
| OF_B | Barrier Completed |
| OF_BE | Barrier completed, Eureka Received |

Table 3, below, shows one embodiment of the BES entity state information stored in each node router 140.

TABLE 3

| | BES entity state in router | |
|---|---|---|
| BMCS | bit mask describing which children from the FANIN tree have requested to join the barrier | |
| FANIN state (FI_S) | FI_S_IDLE: | Idle |
| | FI_S_EUREKA: | Eureka has arrived |
| | FI_S_BARRIER: | All children have joined the barrier |
| | FI_S_EUREKA_BARRIER: | Eureka has arrived and all children have subsequently joined the barrier |
| FANOUT state (OF_S) | OF_S_IDLE: | Idle |
| | OF_S_EUREKA: | Eureka received |
| | OF_S_BARRIER: | Barrier completed |
| | OF_S_BARRIER_EUREKA: | Barrier completed and a later eureka received |

In one embodiment, BMCS is 7 bits, indicating which children have joined a barrier; FI_S is two bits encoding the above states; and FO_S is two bits indicating the above states.

FIGS. 20A and 20B are to be next to one another to form a single table which shows the leaf (or user-visible) BESU state changes and actions resulting from the various operations it receives from the PE 102 and from the FANOUT tree. FO_E causes a "Eureka Event." FO_B causes "Barrier Completion." FO_BE is the same as FO_B followed by FO_E.

Figure 11:
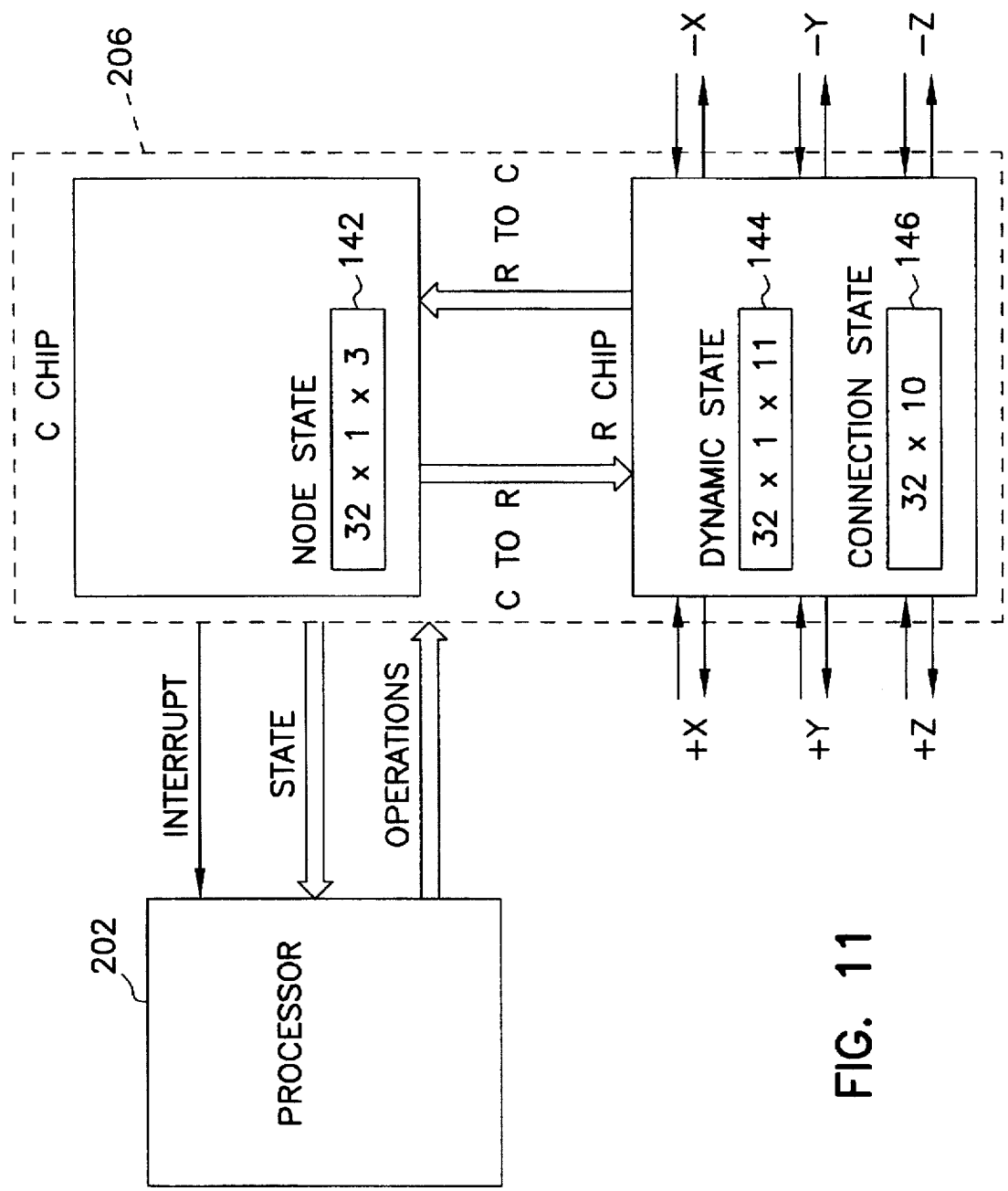
FIG. 11 is a block diagram of an embodiment of a node of multiprocessor system 100 showing blocks of the BES state information for a 3-D torus.

FIG. 11 shows one exemplary embodiment of a node router 140 which can be used in interface-and-network router 206 of the present invention, capable of implementing a 3-D (three-dimensional) torus network for a plurality of PEs 102. Examples for this type of 3-D node router 140 are shown and described in this application, though the present invention is not limited to this style of router, and other embodiments have generalized K-ary N-cube routers or Omega routers. Node router 140 has seven physical input channels and seven physical output channels, which feed the one attached PE 102 connection and the plus X, Y, and Z and minus X, Y, and Z connections to this node (for a total of seven connections). BES messages travel over these seven physical channels to implement the FANIN and FANOUT trees on the 3-D torus fabric. FIG. 11 also shows that in this embodiment, node router 140 contains state information needed to implement FANIN and FANOUT trees. Node state 142 contains node state information. In one embodiment, one-hundred ninety-two (192) bits of node state 142 information are kept, (i.e., 32 times 2 times 3 for the thirty-two BES domains 82, two barriers per BES domain 82, and the 3 bits encode the BES unit state as shown in FIG. 18 for each domain and barrier). In this embodiment, BES unit 145 also includes dynamic state 144 having D×B×(5+(2×N)) bits, where D is thirty-two and represents the number of BES domains 82, B is two and represents the number of barriers in each BES domain 82, N is three and represents the number of dimensions in the network (e.g., a k-ary n-cube), and these 2×N bits encode which children have joined the BES barrier from the FANIN tree, and which children have been sent the BES barrier-completion signal on the FANOUT tree. In this embodiment, 32 domains×10 bits per domain are used to encode connection state 146.

The FANIN tree need not be exactly the same as the FANOUT tree. In one embodiment, the root 70 of the FANIN tree and the root 70 of the FANOUT tree are preferably physically adjacent, and both trees must have the same BES units as leaves 74. For the sake of simplicity of explanation, the examples shown here assume that the FANIN and FANOUT trees of BES entity 80 are identical.

In one embodiment, a distinct BES entity 80 is implemented for each BES domain 82. Each BES domain 82 has a domain identifier. Each BES domain 82 may represent multiple BES entities 80. The BES entities 80 are built and defined via the domain state information contained in every node router 140. Direct connections between nodes in the FANIN and FANOUT trees typically correspond to direct physical connections between node router 140, and the node router 140 themselves correspond to the nodes of the FANIN and FANOUT trees. Non-overlapping BES entities 80 may use the same domain identifier. ("Non-overlapping BES entities 80" are defined as two or more BES entities 80 whose FANIN and FANOUT trees reside in different and separate sets of node router 140 in the system.) This allows the system 100 to require relatively fewer domain identifiers, yet support many BES entities 80.

Figure 12:
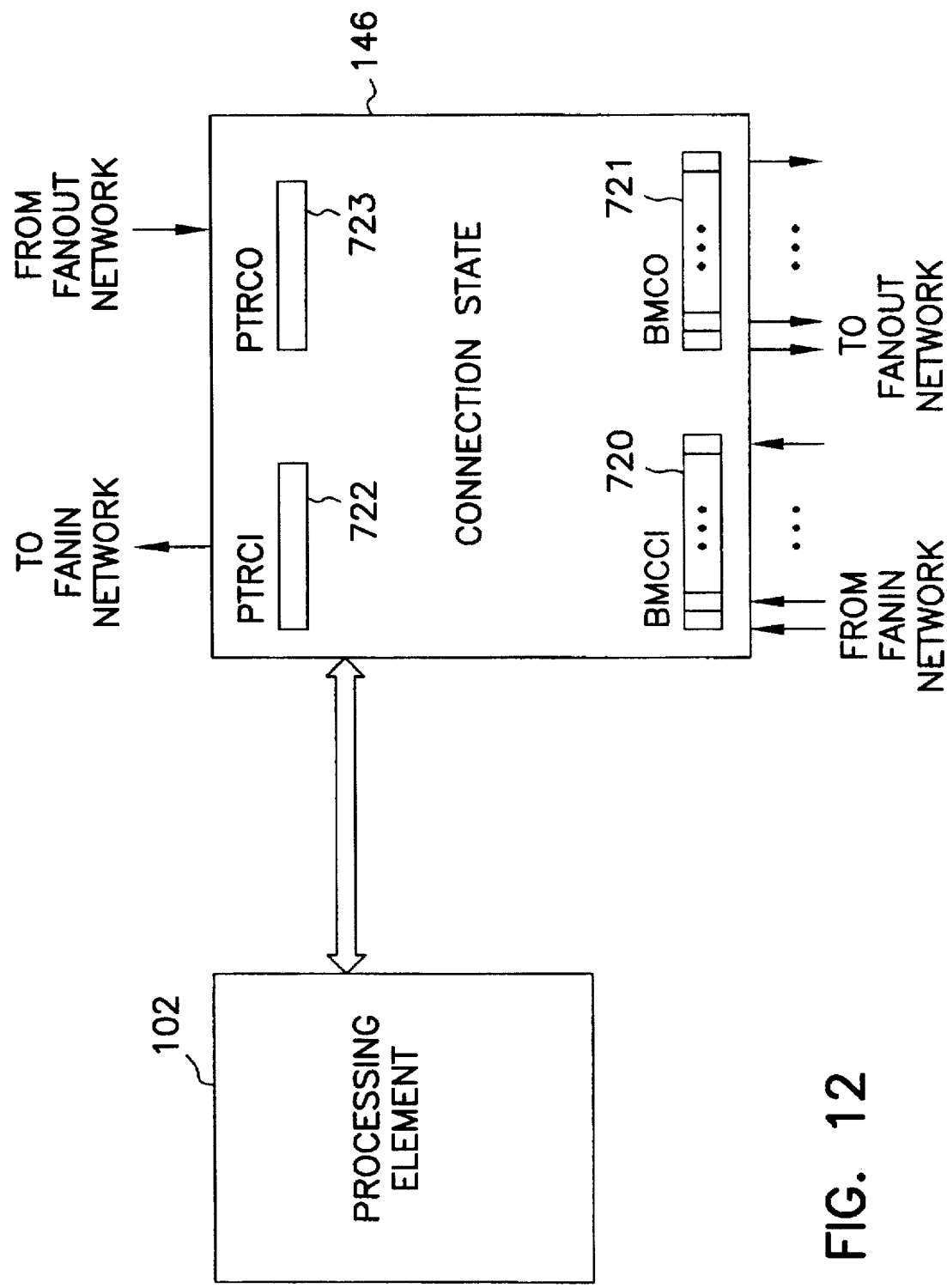
FIG. 12 is a block diagram showing an embodiment of connection state information.

FIG. 12 shows one embodiment of the BES domain state information held in each node router 140 that describes the BES entity 80 (the FANIN and FANOUT trees) which uses that node router 140. This state information defines the barrier/eureka synchronization tree by describing its connections. In one embodiment, this state information is stored in the R-chip shown in FIG. 11. BMCCI 720 is used to detect when all children have joined the FANIN of FI_B. In one embodiment, BMCCI 720 comprises a bit mask with one bit for each possible input channel to that node router 140. In an alternative embodiment, BMCCI 720 comprises a count of the input channels. BMCO 721 is a bit mask with one bit per output channel to specify the children for the FANOUT tree. It is used to specify distribution of the messages towards the leaves of the FANOUT tree. Fanout messages are sent to each of the corresponding output channels where a BMCO bit is "set" in BMCO 721. PTRCI 722 specifies which output channel is the parent for the FANIN tree. FANIN messages are sent to the output channel specified by the value in PTRCI. Special values for PTRCI are used to indicate when the node is the root of the FANIN tree. (When at the root of the FANIN tree, a FANOUT message is sent to the FANOUT tree.) In one embodiment, the BMCCI 720 and the BMCO 721 are implemented sharing the same bit-mask (i.e., they are the same register), and thus the FANIN and FANOUT trees traverse the identical set of node routers 140. For the example node router 140, the bit-mask is 7 bits wide. In one embodiment, PTRCO 723 specifies which input channel is the parent for the FANOUT tree. In one embodiment, PTRCO and PTRCI are the same (i.e., they are one register), and thus the FANIN and FANOUT trees traverse the identical set of node routers 140.

Figure 22:
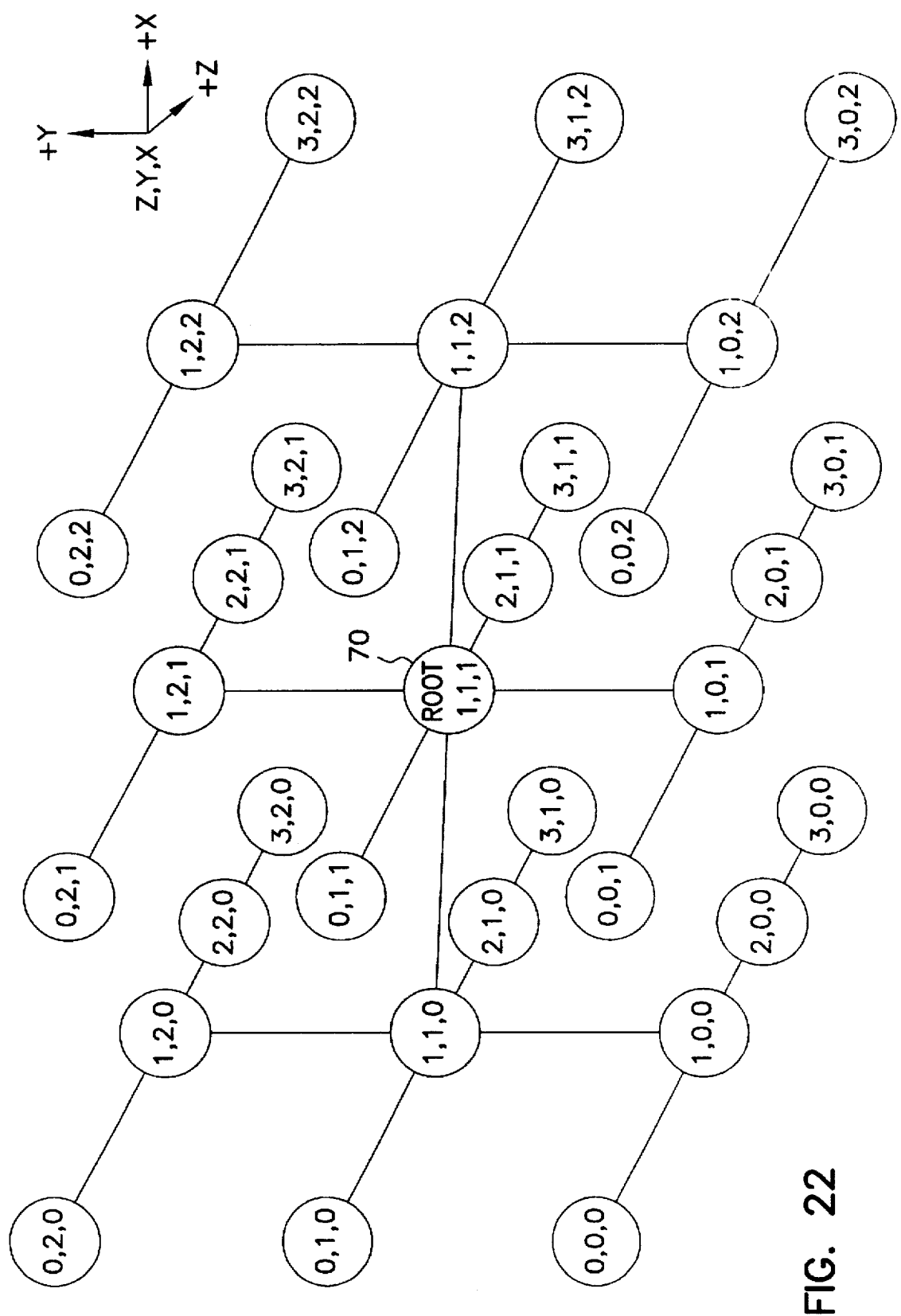
FIG. 22 shows a conceptual diagram of the barrier/eureka-synchronization connections of a portion of a three-dimensional torus network of physical nodes 200.

FIG. 22 and the tables in FIGS. 23 and 24 show an example configuration for BES entity 80. FIG. 22 shows a conceptual diagram of the connections of a portion of a three-dimensional torus network of physical nodes 200 showing the cartesian coordinates of each physical node 200 as a six-digit number (the first digit of which represent the Z position, the middle digit of which represent the y position, and the last digit of which represent the x position). Note that it is assumed that the FANIN and FANOUT trees are identical for this example; BMCCI 720 and BMCO 721 are represented by a single 7-bit mask register. The table in FIG. 24 shows a particular encoding for one embodiment of the PTRCI ("Barrier Parent Node"). FIG. 22 shows the tree that is created. (The numbers next to each node identify the node. Node (1,1,1) is the root 70.) The table in FIG. 23 shows the PTRCI values corresponding to each node ("PARENT FIELD"). It also shows the merged BMCCI-BMCO mask ("CHILD MASK"). The right-most bit corresponds to the processor channels (the barrier connection to the local processor 202 in FIG. 11). The other six bits correspond to the +X, −X, +Y, −Y, +Z, and −Z channels of FIG. 11 (right to left). Note that in this example the nodes (2,0,0,), (2,1,0), (2,2,0), (2,0,1), (2,1,1), and (2,2,1) are not leaves of the tree, as indicated by the low-order bit of their CHILD MASK being 0. They simply propagate barrier/eureka traffic between their adjacent nodes.

The state information held in the node router 140 for each BES entity 80 is shown in Table 3. (Again note: each FANIN/FANOUT BES domain can contain one or more BES entities 80.) The state information components are separated in order to provide the simplest representation. The BM/CS describes which (or in one embodiment, how many) children have joined the FANIN tree barrier. The additional FANIN states includes the IDLE, EUREKA, BARRIER, and BARRIER_EUREKA. EUREKA and BARRIER have similar meaning to their fanin counterparts. BARRIER_EUREKA means that the barrier has fired and was followed by a subsequent EUREKA. (EUREKA_BARRIER does not exist during fanout since a fanout eureka that is followed by a subsequent fanout barrier results in the foregoing eureka being ignored.

The table in FIG. 14 shows the transitions for the FANIN tree states and operations. The SEND column indicates the changes that occur at the time a message is sent to the next higher tree level. If the node is the root of the FANIN tree, a message is sent to the root of the FANOUT tree. For simplicity here, it is assumed that a SEND does not occur at the same time as the receipt of a fanin message. SEND cannot occur when the BES entity 80 is in the state FI_S_IDLE (since there is nothing to send). For any of the other states, the resultant state after the SEND is FI_S_IDLE. FIG. 14 shows which message is sent on a SEND within each SEND table entry box. The first entry applies if the node is not the root and the second if it is. SEND's result is FI_E, FI_B, or FI_EB messages when not the root. When the node is the root, FO_E or FO_B results. FO_BE never happens at this point because FANOUT eurekas are ignored when FANOUT barriers catch up to them.

FI_E causes in a change to FI_S_EUREKA state as shown in FIG. 14. FI_B causes the BM/CS to be updated (either setting a bit in a mask corresponding to the input channel, or else incrementing a counter). Once the barrier is complete, probably detected by an equality check between BM/CS and BM/CCI, the state changes to either FI_S_BAR (if in FI_S_IDLE before) or FI_S_EUREKA_BARRIER (if in FI_S_EUREKA before). FI_EB is identical to FI_E followed by FI_B. No FANIN messages should be received when in the FI_S_BARRIER or FI_S_EUREKA_BARRIER during normal operation.

The table in FIG. 15 shows the transitions for the FANOUT states and operations. Again, the SEND column shows the messages that are propagated up the FANOUT tree for each non-IDLE fanout state. Whereas the fanin messages were single messages, the fanout messages are broadcast (multicast). The state transitions in FIG. 15 assume the broadcast is instantaneous (i.e. each fanout message is sent at the same time). The broadcast doesn't really have to be instantaneous if fanout messages are buffered at the output channel (the buffers are filled instantaneously, though). FO_E causes FO_S_EUREKA when previously in FO_S_IDLE or FO_S_EUREKA states. If previously in the FO_S_BARRIER or FO_S_BARRIER_EUREKA the state goes to FO_S_BARRIER_EUREKA; this corresponds to a subsequent eureka catching up to a earlier barrier (probably because the barrier completion got held up by network contention). FO_B causes FO_S_BARRIER. If the state was previously FO_S_EUREKA, the eureka is ignored because if it ever reached the leaves it would be ignored anyway (the leaves of the subtree rooted at this node must all either be in state S_ARM or S_ARM_I). FO_BE is equivalent to FO_B followed by FO_E.

Figure 13A:
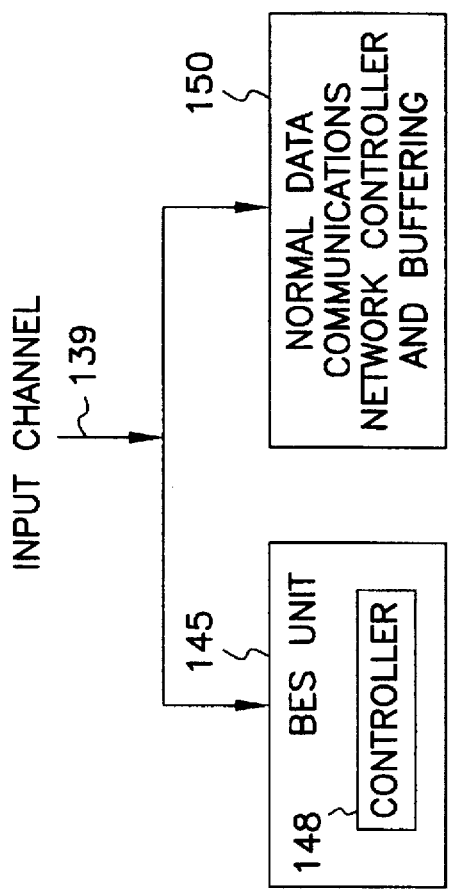
FIGS. 13A and 13B are block diagrams of an embodiment of a node showing the separation and merger of BES messages from and with normal data messages, respectively.
Figure 13B:
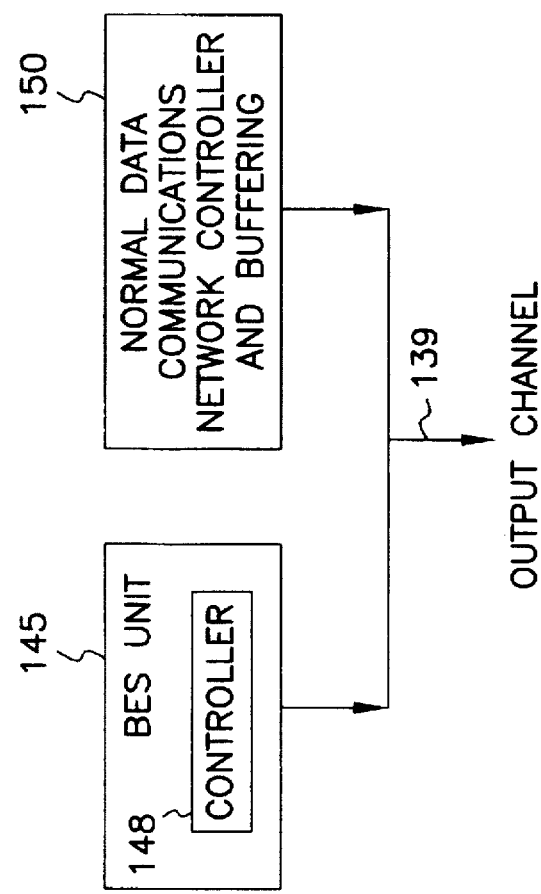

FIG. 13A and 13B show how the BES entity messages (operations) integrate with the data traffic on a node router 140. FIG. 13A shows that BES entity messages from an input physical channel 139 are directed to either the BES unit 145 (if it is a fanin or fanout message) or along the normal path to the normal data-communications controller 150 (if it is a normal message). Similarly, FIG. 13B shows how the output physical channel 139 is shared between either normal data messages or the barrier/eureka messages. The point is that barrier/eureka traffic (i.e., BES messages) and the normal data traffic (i.e., data messages) need share only the physical channel 139. The barrier/eureka traffic need not abide by the buffering or flow control restrictions of the data traffic since all the barrier/eureka state information required in the network is encoded in the BES state within each node router 140 (see Table 3, above). Since the size of the state information is modest, it can affordably be held on the node router 140 in BES buffering, separate from the data traffic buffering. Also, since the buffering is separate, barrier messages can safely be prioritized differently from normal data traffic. In one embodiment for instance, in order to reduce barrier and eureka latencies, the barrier/eureka messages have higher priority than data messages.

Barrier/Eureka Synchronization

The barrier/eureka synchronization mechanism visible to the user in the Barrier/Eureka Synchronization Architecture (BESA) of the present invention is completely redesigned from the version used in the Cray T3D model massively parallel processing system manufactured by Cray Research Inc., the assignee of the present invention. To start with, barrier states are not encoded as single bits. Instead, each barrier/eureka synchronization unit is controlled by a three-bit state code as indicated in the barrier-state encoding table in FIG. 18. The table in FIG. 19 shows various operations available for a barrier/eureka synchronization unit.

Figure 17:
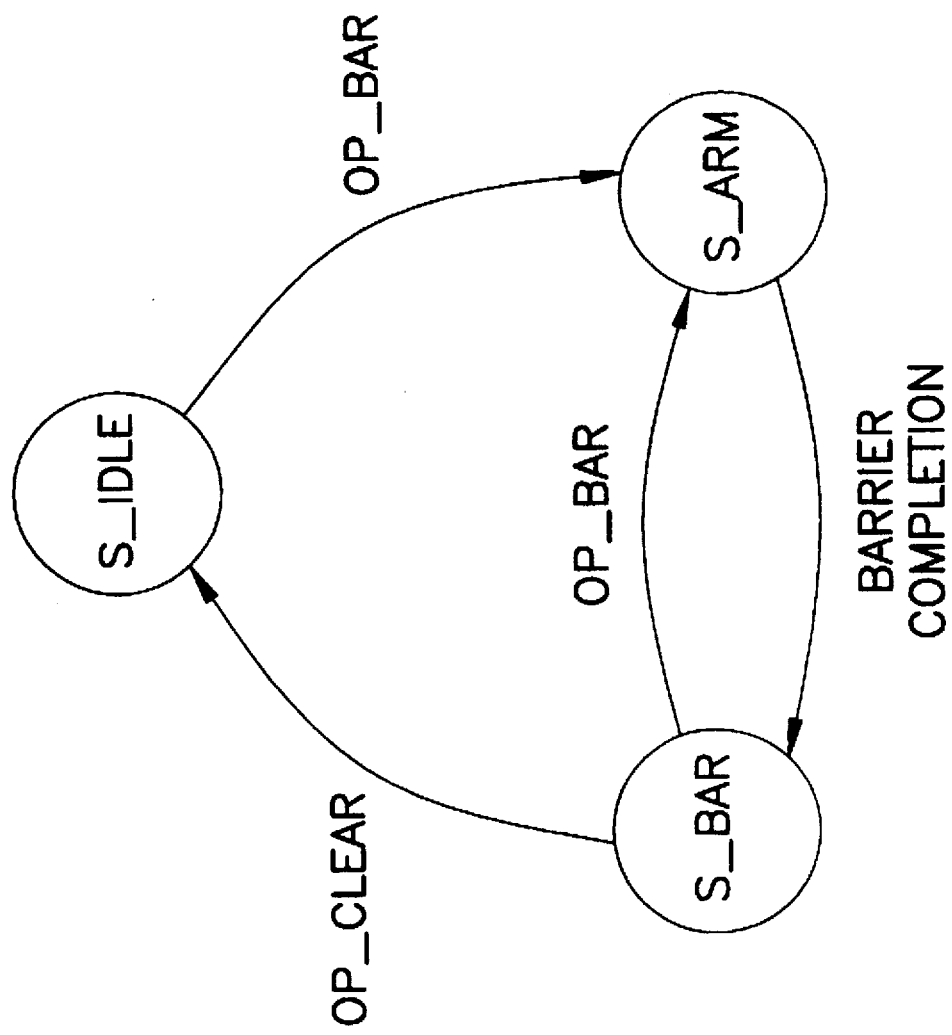
FIG. 17 is a state transition diagram of simple barrier transitions.

A simple T3D barrier is a 0→1→0 transition sequence: a 0→1 transition which occurs as the local PE 102 "arms" the barrier, and a 1→0 transition which occurs as the barrier "completes". A simple BESA barrier is a S_BAR→S_ARM→S_BAR transition sequence: a S_BAR→S_ARM transition which occurs as the local PE 102 executes the OP_BAR operation on the synchronization unit, and the S_ARM→S_BAR transition which occurs as the barrier completes. FIG. 17 indicates these transitions. The S_IDLE state can also be used as a third state for the simple barrier (using the OP_CLEAR operation). This can be useful to indicate that the barrier completion event has been seen (perhaps particularly when using barriers with interrupts). In all other aspects, the S_BAR and S_IDLE states are equivalent.

Referring to FIG. 16, a simple re-usable BESA eureka event is a three-state transition. Unlike T3D eurekas, BESA eurekas do not require an additional barrier synchronization to re-use the BESA eureka, since the barrier is folded into the same synchronization unit as the eureka. In effect, a BESA eureka is a eureka event followed by a barrier completion (or, equivalently, a barrier completion followed by a eureka event). As each PE 102 sees the eureka event (indicated by the S_EUR state), it arms the barrier that will clear out the eureka (and which will indicate that all processors have seen the eureka) by executing the OP_BAR operation on the synchronization unit. The PE 102 that signals the eureka can also go directly from the S_BAR state to the S_ARM state using the OP_EUR_B operation. Once the barrier completes, the eureka can be reused. FIG. 16 shows these transitions. (As in the simple barrier transitions shown in FIG. 17, the simple eureka transitions shown in FIG. 16 could be augmented to include the S_IDLE state as a fourth state.)

The PE 102 can receive interrupts from either eureka event or from a barrier completion event (or both). The OP_INT operation enables an interrupt upon receipt of a eureka event. The OP_BAR_I operation both arms the barrier, and enables an interrupt on barrier completion. The S_EUR_I state is equivalent to the S_EUR state, except that it indicates that an interrupt was signalled. Similarly, the S_BAR_I state is equivalent to the S_BAR state, except that it indicates that an interrupt was signalled. The table in FIG. 20 (comprised of FIGS. 20A and 20B side-by-side) shows all states and all transitions for the barrier/eureka synchronization units.

The OP_RESET operation is a reset feature to recover from system errors by placing the barrier/eureka synchronization unit in a known state. Note that this does not reset the entire tree, only the leaf. (See Section 12.3.)

An implementation of the present invention should specify a fixed maximum delay during which all barrier/eureka operations are guaranteed to complete. (This delay should only be a few microseconds.) A barrier/eureka state can be swapped out after delaying for this amount of time, given that there are no barrier/eureka operations issued to the given barrier/eureka synchronization unit during this delay. Also after this delay, a known barrier/eureka state (either S_BAR or S_BAR_I) can always be reached by issuing an OP_BAR at all the nodes within the partition that are not already in the S_ARM or S_ARM_I state, and waiting for the resultant barrier completion event. A previously-swapped-out barrier/eureka synchronization unit state can be swapped into a new barrier domain by a series of operations that cause the swapped state to be duplicated. (E.g., start all nodes in the S_IDLE state. Complete a barrier for these nodes requiring the S_BAR or S_BAR_I states. After that, issue an OP_INT for those nodes requiring S_IDLE_I state, and the nodes requiring S_EUR or S_EUR_I states can issue an OP_EUR. Concurrently, the nodes requiring the S_ARM or S_ARM_I states issue their OP_BAR or OP_BAR_I. Note that the system cannot simultaneously have one or more swapped nodes in the S_IDLE, S_IDLE_I, S_BAR, or S_BAR_I states while one or more swapped nodes are also in the S_EUR or S_EUR_I states.)

There are no ordering constraints between different barrier/eureka synchronization units (even among the two units within the same domain). Eureka events and barrier completion events to different units may occur in any order.

Barrier registers are accessed through non-cached memory space.

FIG. 21 is an exemplary structure of a barrier register physical address 210 for one embodiment of the present invention. The bit marked "P" indicates privilege (wherein 0=user and 1=system). The bits marked "C C C C C" specify context selection. The bit marked "B" selects between the first and second barrier register, and thus selects one of the two barrier synchronization units that are within each barrier domain. The bits marked "Q" are implementation-defined values (likely zero). The bits marked "z" are reserved (must be zero, else trap).

A read operation directed to the address shown in FIG. 21 returns data having the state of the appropriate barrier/eureka synchronization unit in bits 0:2. A write operation involves the operation specified by bits 0:2 on the appropriate barrier/eureka synchronization unit. In one embodiment, all barrier operations are unprivileged, except for OP_RESET.

Virtual Barrier/Eureka Network

In one embodiment, in addition to carrying interprocessor data communication, a torus network acts as a vehicle for a plurality of virtual barrier/eureka synchronization networks (VBESNs). These VBESNs behave in a manner similar to the BES entities 80 described above, and are called "virtual" because each runs on a separate virtual network, wherein a plurality of virtual networks can share a single physical network. The barrier network in BESA is implemented as a virtual network using the same physical links as the communication torus. Combining the data and synchronization virtual networks onto a physical network allows more efficient use of the physical wires connecting the network.

In one such embodiment, the VBESNs have higher priority for the physical channel between nodes than other traffic, with some added restrictions in order to avoid bandwidth hogging by the VBESNs. Non-blocking data traffic is allowed to utilize the channels in a time-multiplexed manner with the VBESN traffic. A VBESN tree need not be configured symmetrically. A given node in the tree collects fanin events until it determines it is appropriate to pass an event towards the root of the tree. Fanout events are passed towards the leaves as soon as they are detected.

In this embodiment, each node has thirty-two barrier domains 82; and each barrier domain implements one barrier and can be configured independently of the other thirty-one barrier domains 82. Each barrier domain 82 can be configured into any number of independent sub-networks, each having a BES entity 80, with the constraint that no two sub-networks of the same virtual network (i.e., within the same one-barrier group) is allowed to share a node 200. Valid configurations are built through nearest-neighbor connections only. A given node 200 in a tree is able to fanin/fanout to its six nearest neighbors and to the PE 102 to which it is attached.

Each VBESN uses the "CHILD MASK" of its BMCCI[i] register 720 to select its children (i.e., the children of a node are the inputs to be combined on fanin and the outputs to be used on fanout). The "PARENT FIELD" of the PTRCI[i] 722 (using the same i index) is used to select the parent node for this node. In this embodiment, barriers/eurekas fanout on the same communications links, but proceeding in opposite directions, that they fanin (thus BMCO register 721 is the same as BMCCI register 720, and PTRCI register 722 is the same as PTRCO register 723). In one such embodiment, each barrier domain has its own network configuration registers 720 and 722 on each given node as described above for FIGS. 22, 23, and 24.

There are two ways in which a given node 200 can join a VBESN barrier, as far as the network is concerned. The first is simply to join the barrier as described above in the discussion of BES entities 80. The other is to modify the appropriate BMCCI[i] register 720 and PTRCI[i] register 722 to remove that particular node from the barrier tree (note that this must be done at the nearest fork, which is not necessarily on the retreating node.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system comprising:

a plurality of processor entities (PEs), each connected to a processor entity node (PE node), including a first processor entity (PE) connected to a first PE node;

a communications network, wherein the communications network connects to the PE node of each one of the plurality of PEs;

a memory coupled to the first PE; and a barrier/eureka synchronization (BES) domain coupled to the communications network, the BES domain comprising:

BES messaging means for sending and receiving messages between pairs of the plurality of PEs, wherein the messages include a barrier-join message, a eureka message, and a barrier-complete messages, and wherein a barrier-complete message is transmitted from the first PE node as a result of a receipt of a barrier-join message into the first PE node; and for each one of the plurality of PEs, a BES state register, wherein the BES state register for the first PE stores an indication of one of a plurality of BES states.

2. The computer system according to claim 1, the BES domain further comprising a first portion of the BES domain for the first PE node, the first portion of the BES domain comprising:

a first plurality of node interconnection ports for the first PE node, wherein the first plurality of node interconnection ports is operable to connect the first PE node to a plurality of other PE nodes;

a barrier/eureka synchronization (BES) child connection register coupled to the first plurality of node interconnection ports, wherein the BES child connection register specifies which ones of the plurality of PE nodes are children of the first PE node; and a BES parent connection register coupled to the first plurality of node interconnection ports, wherein the BES parent connection register specifies which one of the plurality of PE nodes is a parent of the first PE node.

3. A first node router for use in a multiprocessor computer system having a plurality of other node routers, the first node router comprising:

a first plurality of node interconnection ports, each operable to connect the first node router to the plurality of other node routers;

a first BES messaging circuit coupled to the first plurality of node interconnection ports, wherein the first BES messaging circuit selectively sends and receives BES messages between the first node router and the plurality of other node routers, wherein the BES messages include a barrier-join message, a eureka message, and a barrier-complete message, and wherein the barrier complete message is transmitted by the first node router to another node router as a result of a receipt by the first node router of a barrier-join message; and a first BES state register coupled to the first BES messaging circuit;

a first BES state changer coupled to the first BES state register and to the first BES messaging circuit, and responsive to a BES state stored in the first BES state register and to a BES message received by the first BES messaging circuit.

4. The first node router according to claim 3, further comprising:

a first barrier/eureka synchronization (BES) child connection register coupled to the first BES messaging circuit, wherein the first BES child connection register specifies which ones of the plurality of other node routers are children of the first node router; and a first BES parent connection register coupled to the first BES messaging circuit, wherein the first BES parent connection register specifies which one of the plurality of other node routers is a parent of the first node router.

5. A massively parallel processor system comprising:

a virtual barrier/eureka synchronization network (VBESN) running on a physical data-communication network, the physical data-communication network coupling a plurality of processor entities (PEs) including a memory, a first PE connected to a first node, and a plurality of other PEs each connected to a respective node, the VBESN comprising:

BES messaging means for sending and receiving BES messages on the physical data-communication network between the first PE and the plurality of other PEs, wherein the BES messages comprise a barrier-join message, and wherein a barrier-join message is transmitted on the physical data-communication network from the first PE node to another PE node as a result of the first PE node receiving a barrier-join message; and BES state changing means for changing a BES state and responsive to the BES state and to a BES message received by the BES messaging means.

6. The system according to claim 5, wherein the BES messages further comprise a barrier-complete message, and wherein the barrier complete message is transmitted as a result of a receipt of a barrier-join message.

7. The system according to claim 6, wherein the BES messages further comprise a eureka message.

8. The system according to claim 7, further comprising: BES state storage means, wherein the BES state is stored in the BES state storage means.

9. The system according to claim 8, further comprising:

BES child-connection storage means for specifying which ones of the plurality of other PE nodes are children of the first PE node; and BES parent-connection register means for specifying which one of the plurality of other PE nodes is a parent of the first PE node.

10. The system according to claim 7, further comprising:

BES child-connection storage means for specifying which ones of the plurality of other PE nodes are children of the first PE node; and BES parent-connection register means for specifying which one of the plurality of other PE nodes is a parent of the first PE node.

11. The system according to claim 5, wherein the BES messages further comprise a eureka message.

12. The system according to claim 5, further comprising:
BES state storage means, wherein the BES state is stored in the BES state storage means.

13. The system according to claim 12, wherein the BES state storage means stores a BES state for each of a plurality of BES domains.

14. The system according to claim 5, further comprising:
BES child-connection storage means for specifying which ones of the plurality of other PE nodes are children of the first PE node; and
BES parent-connection register means for specifying which one of the plurality of other PE nodes is a parent of the first PE node.

15. The system according to claim 5, further comprising:
BES configuration means for defining a VESBN structure, selected from a plurality of possible VESBN structures, that specifies the VESBN and the resultant routing of BES messages on the physical data communications network.

16. A method for synchronizing barrier and eureka events in a computer system having a physical data-communication network, the physical data-communication network connected to a plurality of processor entities (PEs) including a first PE associated with a first PE node and a plurality of other PEs each associated with a respective PE node, comprising the steps of:
receiving BES messages on the physical data-communication network to the first PE node from a first subset of the plurality of other PE nodes;
sending BES messages on the physical data-communication network from the first PE node to a second subset of the plurality of other PE nodes, wherein the BES messages comprise a barrier-join message, and wherein a barrier-join message is sent on the physical data-communication network from the first PE node to another PE node as a result of the first PE node receiving a barrier-join message;
storing a BES state for the first PE; and
changing the BES state responsive to the BES state and to a received BES message, and wherein the BES messages comprise a barrier-join message.

17. The method according to claim 16, wherein the BES messages further comprise a eureka message.

18. The method according to claim 16, wherein the BES messages further comprise a barrier-complete message, and wherein the barrier complete message is sent based on a receipt of a barrier-join message.

19. The method according to claim 16, further comprising the steps of:
keeping a children value indicative of the first subset of the plurality of other PEs which are children of the first PE; and
keeping a parent value indicative of the second subset of the plurality of other PEs which is a parent of the first PE,
and wherein:
the step of receiving BES messages depends on the children value, and
the step of sending BES messages depends on the parent value.

20. The method according to claim 16, further comprising the step of:
changing a BES configuration and the resultant routing of BES messages on the physical data communications network, wherein the BES configuration defines a virtual barrier/eureka synchronization network (VBESN) structure, selected from a plurality of possible VESBN structures.

* * * * *